United States Patent
Chiu et al.

(10) Patent No.: US 12,078,840 B1
(45) Date of Patent: Sep. 3, 2024

(54) BACKLIGHT MODULE AND LIGHT GUIDE MODULE

(71) Applicant: Chicony Power Technology Co., Ltd., New Taipei (TW)

(72) Inventors: Chen-Hao Chiu, New Taipei (TW); Chien-Hsun Kao, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 18/393,723

(22) Filed: Dec. 22, 2023

(30) Foreign Application Priority Data

Sep. 8, 2023 (TW) .................................. 112134302

(51) Int. Cl.
    *F21V 8/00*             (2006.01)

(52) U.S. Cl.
    CPC ............. *G02B 6/006* (2013.01); *G02B 6/002* (2013.01); *G02B 6/005* (2013.01); *G02B 6/0068* (2013.01)

(58) Field of Classification Search
CPC ........ G02B 6/006; G02B 6/002; G02B 6/005; G02B 6/0068; G02B 6/0058; G02B 6/0033; G02B 6/0035; G02B 6/0055; G02B 6/0066; G02B 6/0073; G02B 6/0015; F21V 2200/00; F21V 2200/20
See application file for complete search history.

(56) References Cited

U.S. PATENT DOCUMENTS

| | | | | |
|---|---|---|---|---|
| 9,977,171 | B2 * | 5/2018 | Nakashima | .......... G02B 6/0036 |
| 11,404,609 | B1 * | 8/2022 | Ho | ......... G02B 6/0073 |
| 11,675,119 | B1 * | 6/2023 | Ho | ......... G02B 6/0068 |
| | | | | 362/606 |
| 2015/0234114 | A1 | 8/2015 | Nakashima et al. | |

FOREIGN PATENT DOCUMENTS

| | | |
|---|---|---|
| CN | 210294594 U | 4/2020 |
| CN | 215376827 U | 12/2021 |
| TW | 201022744 A | 6/2010 |
| TW | 201309975 A | 3/2013 |
| TW | I432801 B | 4/2014 |
| TW | 201830068 A | 8/2018 |
| TW | I709259 B | 11/2020 |
| TW | 202206979 A | 2/2022 |
| TW | 202228172 A | 7/2022 |

\* cited by examiner

*Primary Examiner* — Bao Q Truong
(74) *Attorney, Agent, or Firm* — CKC & Partners Co., LLC

(57) ABSTRACT

A backlight module includes a light-shielding plate, a light guide plate, a first light-emitting element, and a second light-emitting element. The light-shielding plate has a first light transmissive portion. The light guide plate has a first light-emitting dotting area. The first light-emitting dotting area includes a plurality of first dots unevenly distributed within a range of the first light-emitting dotting area. The first light-emitting element and the second light-emitting element emit light toward the first light-emitting dotting area. The light guide plate has a light-emitting surface in a generally rectangular shape. The light guide plate has a first long axis direction extended parallel to a long side on the light-emitting surface. The first light-emitting element has a second long axis direction. An angle between the first long axis direction and the second long axis direction is an acute angle.

20 Claims, 14 Drawing Sheets

BACKLIGHT MODULE AND LIGHT GUIDE MODULE

CROSS-REFERENCE TO RELATED APPLICATION

This application claims priority to Taiwan Application Serial Number 112134302, filed Sep. 8, 2023, which is herein incorporated by reference.

BACKGROUND

Field of Invention

The present disclosure relates to a backlight module and a light guide module.

Description of Related Art

In recent years, computer peripheral manufacturers have begun to develop light touchpads with excellent visual effects. According to the user's different functional requirements, different button icons can be disposed on the light touchpad for the user to click to trigger the function required by the user. The conventional light touch pad utilizes the arrangement design of the light-emitting elements, the light guide plate, and the light-shielding plate, such that each button icon can be illuminated independently.

However, existing light touch pad has limitations in light mixing capabilities. Specifically, due to the space limitations of the electronic device (for example, a notebook computer) or the limited light-emitting capacity of the light-emitting element, the button icons illuminated by light have a visual defect of uneven light. For example, uneven light mixing will cause the overall brightness of a single button icon to be uneven, thereby reducing the user experience.

Therefore, how to propose a backlight module and a light guide module that can solve the above problems is one of the problems that the industry is currently eager to invest in research and development resources to solve.

SUMMARY

In view of this, one purpose of present disclosure is to provide a backlight module and a light guide module that can solve the aforementioned problems.

In order to achieve the above objective, according to an embodiment of the present disclosure, a backlight module includes a circuit board, a light-shielding plate, a light guide plate, a light-partitioning portion, a first light-emitting element, a second light-emitting element, and a reflective sheet. The light-shielding plate is disposed over the circuit board and has a first light transmissive portion. The light guide plate has a first light-emitting dotting area disposed corresponding to the first light transmissive portion. The first light-emitting dotting area includes a plurality of first dots. The first dots are non-evenly distributed within a range of the first light-emitting dotting area. The light-partitioning portion is disposed adjacent to the light guide plate. The light guide plate, the light-partitioning portion, and the light-shielding plate surround a first accommodating area. A light mixing zone is located between the first accommodating area and the first light-emitting dotting area. The first light-emitting element and the second light-emitting element are disposed on the circuit board. At least one of the first light-emitting element and the second light-emitting element passes through the first accommodating area and emits light toward the first light-emitting dotting area. The reflective sheet is disposed between the light guide plate and the circuit board. The first light-emitting element forms a first illuminating zone along a first light-emitting axis with a first light-emitting angle. The second light-emitting element forms a second illuminating zone along a second light-emitting axis with a second light-emitting angle. The light guide plate has a light-emitting surface in a generally rectangular shape. The light guide plate has a first long axis direction extending along a long side of the light-emitting surface. The first light-emitting element has a second long axis direction perpendicular to the first light-emitting axis. The second light-emitting element has a third long axis direction perpendicular to the second light-emitting axis. The second long axis direction and the first long axis direction form an acute angle. The first light-emitting dotting area is located within a range where the first illuminating zone and the second illuminating zone overlap.

In one or more embodiments of the present disclosure, a density of the first dots gradually increases along a distributing direction away from the first light-emitting element or the second light-emitting element, and the distributing direction is parallel to the first light-emitting axis and forms an acute angle with the first long axis direction.

In one or more embodiments of the present disclosure, the second long axis direction is parallel to the third long axis direction.

In one or more embodiments of the present disclosure, the second long axis direction is not parallel to the third long axis direction.

In one or more embodiments of the present disclosure, the backlight module further comprises a third light-emitting element disposed on the circuit board and further has a second accommodating area. The light guide plate further has a second light-emitting dotting area separated from the first light-emitting dotting area. The third light-emitting element passes through the second accommodating area and emits light toward the second light-emitting dotting area. The second light-emitting dotting area includes a plurality of second dots. The second dots are non-evenly distributed within a range of the second light-emitting dotting area.

In one or more embodiments of the present disclosure, the third light-emitting element forms a third illuminating zone along a third light-emitting axis with a third light-emitting angle. The second light-emitting dotting area is located within a range of the third illuminating zone.

In one or more embodiments of the present disclosure, the third light-emitting element has a fourth long axis direction perpendicular to the third light-emitting axis. The fourth long axis direction is perpendicular to the first long axis direction.

In one or more embodiments of the present disclosure, a density of the second dots gradually increases along a distributing direction away from the third light-emitting element. The distributing direction is parallel to the first long axis direction.

In one or more embodiments of the present disclosure, the third light-emitting element has a fourth long axis direction perpendicular to the third light-emitting axis. The fourth long axis direction forms an acute angle with the first long axis direction.

In one or more embodiments of the present disclosure, a density of the second dots gradually increases along a distributing direction away from the third light-emitting element. The distributing direction forms an acute angle with the first long axis direction.

In one or more embodiments of the present disclosure, the light-shielding plate further includes a second light transmissive portion disposed corresponding to the second light-emitting dotting area.

In one or more embodiments of the present disclosure, the light-partitioning portion is disposed between the first light-emitting dotting area and the second light-emitting dotting area.

In one or more embodiments of the present disclosure, the light guide plate has a first light incident surface and a second light incident surface facing the first light-emitting element and the second light-emitting element respectively. The first light incident surface is recessed away from the first light-emitting element and the second light incident surface is recessed away from the second light-emitting element.

In one or more embodiments of the present disclosure, the light guide plate has a first light incident surface and a second light incident surface facing the first light-emitting element and the second light-emitting element respectively. The first light incident surface and the second light incident surface are zigzag surfaces.

In one or more embodiments of the present disclosure, the light guide plate has a first light incident surface and a second light incident surface facing the first light-emitting element and the second light-emitting element respectively. The backlight module further includes a first light-compensating element and a second light-compensating element. The light guide plate further has a third light incident surface and a fourth light incident surface facing the second light-compensating element and the first light-compensating element respectively. The first light-compensating element and the first light-emitting element are disposed along opposite sides of the first light-emitting dotting area. The second light-compensating element and the second light-emitting element are disposed along opposite sides of the first light-emitting dotting area.

In order to achieve the above objective, according to an embodiment of the present disclosure, a light guide module includes a light-shielding plate, a light guide plate, and a light-partitioning portion. The light-shielding plate has a first light transmissive portion. The light guide plate is disposed below the light-shielding plate. The light guide plate has a first light-emitting dotting area. The first light-emitting dotting area is disposed corresponding to the first light transmissive portion. The light guide plate has a first light incident surface and a second light incident surface disposed adjacent to a short side of the light guide plate. The light guide plate is disposed with a first accommodating area and a second accommodating area that are hollowed. The light-partitioning portion is disposed below the light-shielding plate. The first light-emitting dotting area includes a plurality of first dots. A density of the first dots gradually increases along a direction away from the short side. The first light incident surface has a first normal line, the second light incident surface has a second normal line, and the first normal line and the second normal line pass through the first light-emitting dotting area. Each of The first normal line and the second normal line forms an acute angle with a long side of the light guide plate.

In one or more embodiments of the present disclosure, the first light incident surface and the second light incident surface are arc-shaped surfaces.

In one or more embodiments of the present disclosure, the first light incident surface and the second light incident surface are zigzag surfaces.

In one or more embodiments of the present disclosure, the first light incident surface and the second light incident surface are planar surfaces.

In one or more embodiments of the present disclosure, the first accommodating area is formed by being surrounded by the light-shielding plate, the first light incident surface, and the light-partitioning portion, and the second accommodating area is formed by being surrounded by the light-shielding plate, the second light incident surface, and the light-partitioning portion.

In summary, in the backlight module of the present disclosure, since the light-partitioning portion is disposed between the first light-emitting dotting area and the second light-emitting dotting area, the light-partitioning portion can shield the light that emitted by the light-emitting elements used to individually light up different light transmissive portions, so that the light is separated without interfering with each other, thereby allowing several light-emitting patterns displayed by different light transmissive portions can be presented independently. In the backlight module of the present disclosure, since the light guide plate is disposed with a light-emitting dotting area including several dots, and the light-emitting dotting area is disposed corresponding to the light transmissive portion, the light-emitting pattern displayed on the light transmissive portion can have sufficient brightness. In the backlight module of the present disclosure, since the first light-emitting axis of the first light-emitting element and the second light-emitting axis of the second light-emitting element are not parallel to the first long axis direction of the light guide plate, the light transmissive portions disposed close to the edge of the light guide plate can still achieve the visual effect of uniform light when lit by light-emitting elements of different colors. In the backlight module of the present disclosure, when the light emitted by the light-emitting element continues to propagate and the energy is attenuated, since the density of the dots gradually increases along the distributing direction away from the light-emitting element, the brightness at one end of the light transmissive portion away from the light-emitting element is not reduced due to the attenuation of light energy. In the backlight module of the present disclosure, since the light incident surface of the light guide plate has a light-diffusion structure with an arc-shaped surface or a rough surface, the light can be diffused before reaching the light-emitting dotting area, thereby achieving the effect of shortening the light mixing distance.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
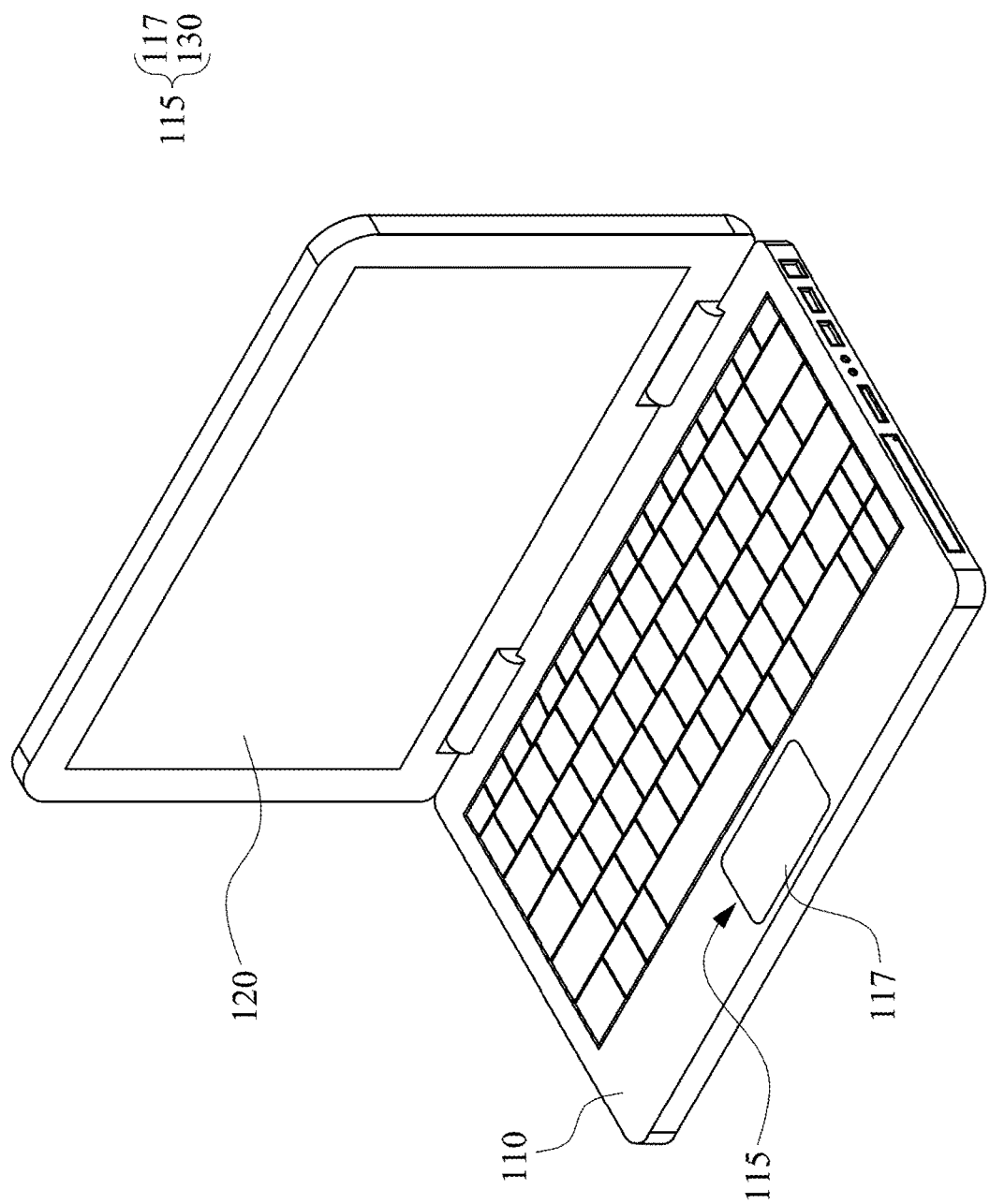
FIG. 1 is a perspective view of an electronic device in accordance with an embodiment of the present disclosure.

A plurality of embodiments of the present disclosure will be disclosed in figures below. For clarity, many practical details will be explained in the following description. However, it should be understood that these practical details should not be used to limit the disclosure. That is to say, in some embodiments of the present disclosure, these practical details are not necessary. In addition, for the sake of simplifying the drawings, some commonly used structures and components will be depicted in a simple schematic manner in the drawings. The same reference numbers will be used throughout the drawings to refer to the same or similar elements.

Reference is made to FIG. 1. FIG. 1 is a perspective view of an electronic device 100 in accordance with an embodiment of the present disclosure. As shown in FIG. 1, in this embodiment, the electronic device 100 includes a host 110, a touchpad device 115, and a display 120. In this embodiment, as shown in FIG. 1, the touchpad device 115 further includes a cover 117 and a backlight module 130. Since the backlight module 130 is located below the cover 117, the specific structure of the backlight module 130 is not shown in FIG. 1. The touchpad device 115 is an input device disposed in the host 110, but the present disclosure is not limited thereto. In practical applications, the backlight module 130 can also be an electronic product that uses a touchpad as an input or operation interface (for example, a personal digital assistant, a keyboard including a touchpad, etc.). That is, concepts of the backlight module 130 of the present disclosure may be applied to any electronic product using a touchpad as an input or operation interface. The structures and functions of some elements included in the backlight module 130 as well as the connections and operation relationships among these elements will be described in detail below.

Figure 2:
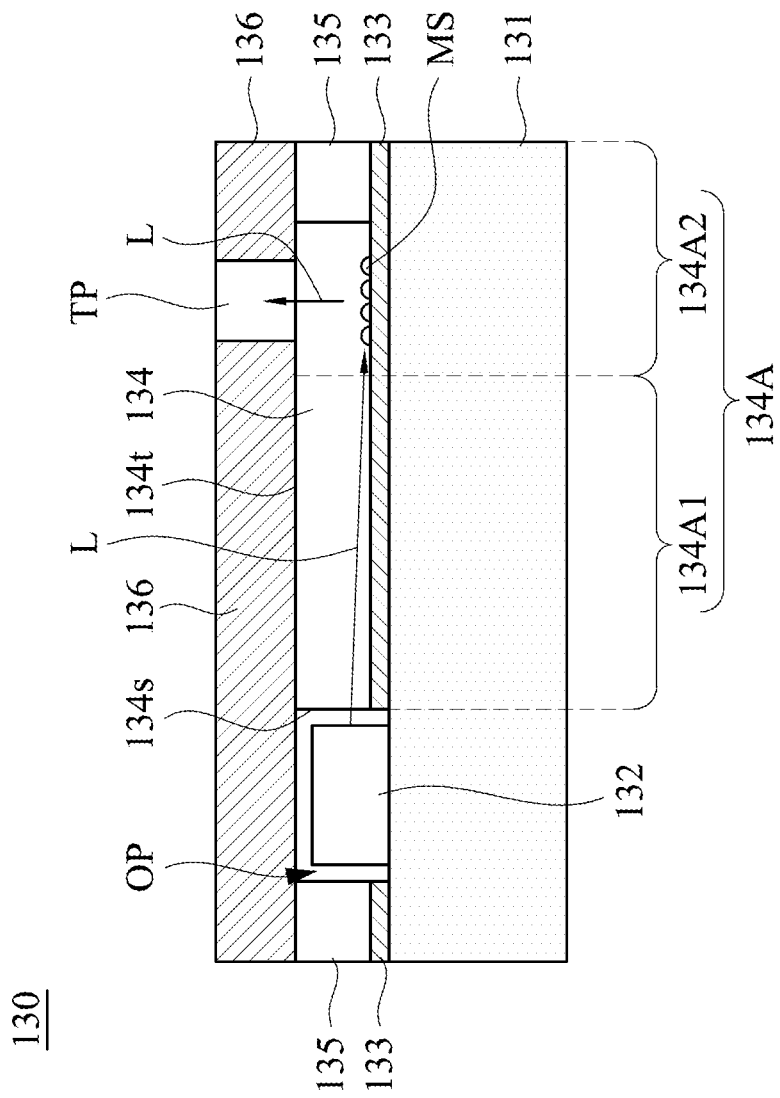
FIG. 2 is a cross-sectional view of an backlight module in accordance with an embodiment of present disclosure.

Reference is made to FIG. 2. FIG. 2 is a cross-sectional view of the backlight module 130 in accordance with an embodiment of the present disclosure. As shown in FIG. 2, in this embodiment, the backlight module 130 is exposed through an opening of a housing of the host 110. The backlight module 130 includes a circuit board 131, a light-emitting element 132, a reflective sheet 133, a light guide plate 134, a light-partitioning portion 135, and a light-shielding plate 136. The assembly composed of the light guide plate 134, the light-partitioning portion 135, and the light-shielding plate 136 is a light guide module in the backlight module 130. The circuit board 131 may include touch control circuitry. The light-emitting element 132 is disposed on the circuit board 131 and configured to emit light L. The reflective sheet 133 is disposed on the circuit board 131 and has a hollowed portion for the light-emitting element 132 to pass through. The light guide plate 134 is disposed below the light-shielding plate 136. In some embodiments, the light guide plate 134 is disposed on the reflective sheet 133. The light guide plate 134 has a light guide area 134A. The light guide area 134A is divided into a light mixing zone 134A1 and a light-emitting dotting area 134A2. As shown in FIG. 2, the light-emitting dotting area 134A2 includes several dots MS. The light guide plate 134, the light-partitioning portion 135, and the light-shielding plate 136 define an accommodating area OP. In detail, the accommodating area OP is hollowed, and the accommodating area OP is defined by the circuit board 131, the light guide plate 134, the light-partitioning portion 135, and the light-shielding plate 136. In other words, the accommodating area OP is substantially a space surrounded by the light guide plate 134, the light-partitioning portion 135, and the light-shielding plate 136. The light-emitting element 132 is disposed on the circuit board 131 and passes through the accommodating area OP, and the light-emitting element 132 emits light toward the light-emitting dotting area 134A2. In some embodiments, the reflective sheet 133 is disposed between the light guide plate 134 and the circuit board 131. The light-partitioning portion 135 is disposed adjacent to the light guide plate 134 and below the light-shielding plate 136. In some embodiments, the light-partitioning portion 135 is located on the reflective sheet 133. In some embodiments, the light guide plate 134 is embedded in the light-partitioning portion 135. The light-shielding plate 136 is disposed over the circuit board 131 and has a light transmissive portion TP. In some embodiments, the light transmissive portion TP transmits the light L to display the button icon. The light-emitting dotting area 134A2 is disposed corresponding to the light transmissive portion TP, and the accommodating area OP is separated from the light-emitting dotting area 134A2. Specifically, the light-shielding plate 136 covers the light-emitting element 132, the light guide plate 134, and the light-partitioning portion 135, and a light mixing zone 134A1 is disposed between the accommodating area OP and the light-emitting dotting area 134A2. In some embodiments, the light guide plate 134 has a light incident surface 134$s$ and a light-emitting surface 134$t$, and the light-emitting surface 134$t$ faces the light transmissive portion TP. In some embodiments, the light-emitting element 132 is configured to emit light toward the light guide plate 134 laterally. Since the light guide plate 134 is embedded in the light-partitioning portion 135, the light L transmitted in the light guide plate 134 will be blocked by the light-shielding plate 136 when it reaches the outer edge of the light guide plate 134 without light leakage. Since the reflective sheet 133 is disposed below the light guide plate 134, it is ensured that the light L transmitted in the light guide plate 134 is merely emitted from the light-emitting surface 134t of the light guide plate 134.

In some embodiments, the accommodating area OP may also be disposed to directly pass through the light guide plate 134 instead of being surrounded by the light-partitioning portion 135. Regardless of whether the accommodating area OP is formed by passing through a single element or formed by plural surrounding elements, these do not deviate from the spirit and scope of the present disclosure.

In some embodiments, the light-emitting element 132 may be, for example, a light emitting diode or other suitable light source.

In some embodiments, the light-partitioning portion 135 is substantially opaque. In some embodiments, the light-partitioning portion 135 may be, for example, black polycarbonate (PC) or other non-light-transmissive materials.

In some embodiments, the dots MS are disposed on a side of the light guide plate 134 away from the light-emitting element 132. In some embodiments, the dots MS may be, for example, micro-structures or other optical structures. In some embodiments, the dots MS are recessed from a bottom surface of the light guide plate 134. However, the present disclosure is not intended to limit the quantity and shape of the dots MS.

Figure 3:
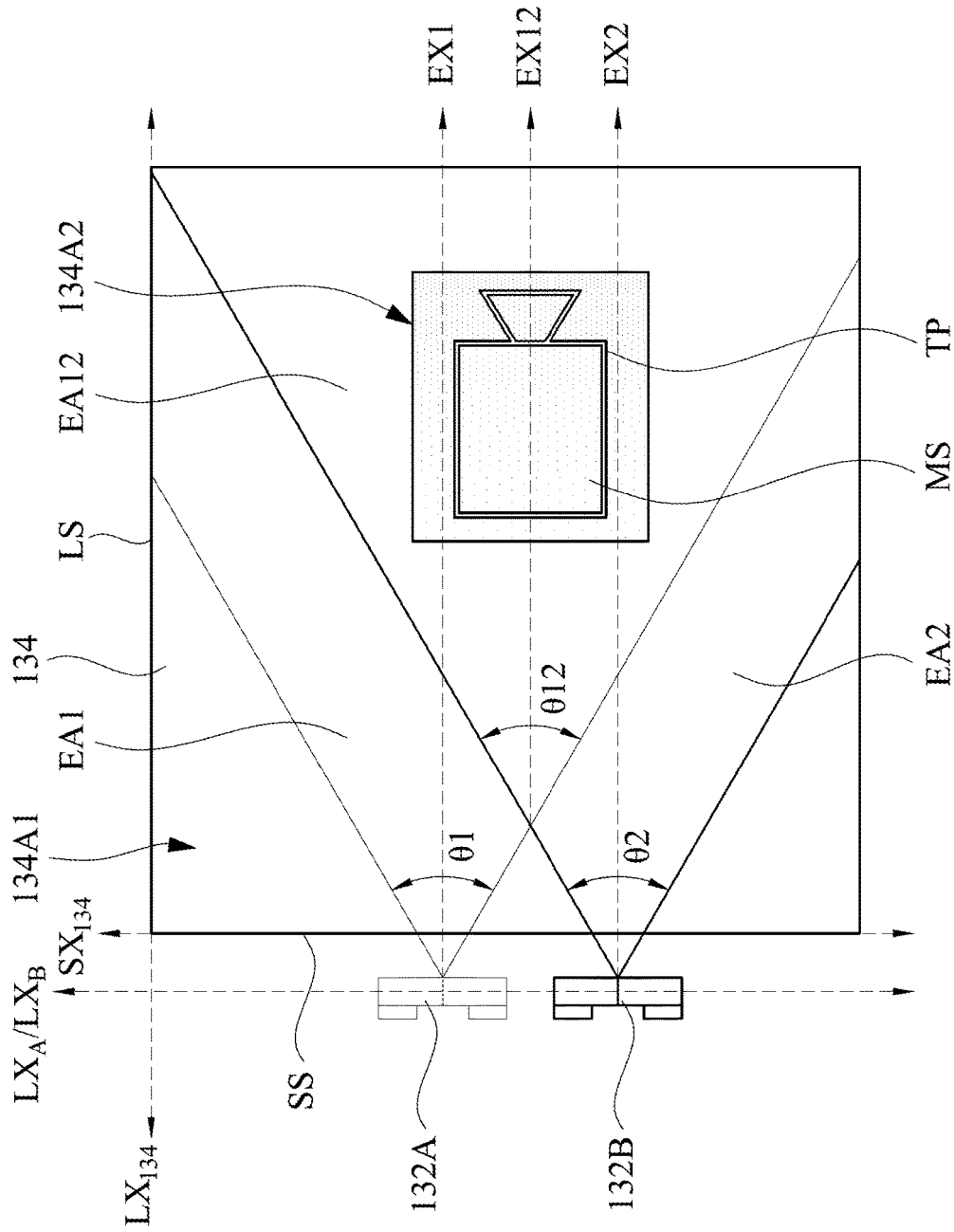
FIG. 3 is a front view of a first light-emitting element, a second light-emitting element, a light mixing zone and a light-emitting dotting area in accordance with an embodiment of the present disclosure.

Reference is made to FIG. 3. FIG. 3 is a front view of a first light-emitting element 132A, a second light-emitting element 132B, the light mixing zone 134A1, and the light-emitting dotting area 134A2 of the backlight module 130 in accordance with an embodiment of the present disclosure. FIG. 3 is depicted from a view facing the light-emitting surface 134t of the light guide plate 134. As shown in FIG. 3, in this embodiment, the backlight module 130 may include the first light-emitting element 132A and the second light-emitting element 132B. The first light-emitting element 132A forms a first illuminating zone EA1 along the first light-emitting axis EX1 at a first light-emitting angle θ1, and the second light-emitting element 132B forms a second illuminating zone EA2 along the second light-emitting axis EX2 at a second light-emitting angle θ2. The area where the first illuminating zone EA1 and the second illuminating zone EA2 overlap forms an overlapping illuminating zone EA12. As shown in FIG. 3, the overlapping illuminating zone EA12 has an overlapping light-emitting angle θ12 and an overlapping illuminating zone light-emitting axis EX12. Specifically, the overlapping illuminating zone light-emitting axis EX12 is substantially the angular bisector of the overlapping light-emitting angle θ12. The light-emitting dotting area 134A2 is located within a range where the first illuminating zone EA1 and the second illuminating zone EA2 overlap (for example, located within the overlapping illuminating zone EA12). As shown in FIG. 3, the dots MS of the light-emitting dotting area 134A2 are non-evenly distributed within the range of the light-emitting dotting area 134A2. The light transmissive portion TP is located within the range of the light-emitting dotting area 134A2.

In some embodiments, the first light-emitting element 132A and the second light-emitting element 132B respectively emit light L of different colors. In some embodiments, the first light-emitting element 132A and the second light-emitting element 132B do not emit light at the same time. In this case, since the light-emitting dotting area 134A2 is located within the range where the first illuminating zone EA1 and the second illuminating zone EA2 overlap, the light transmissive portion TP can emit light uniformly when light L of different colors emits.

Reference is made again to FIG. 3. The light guide plate 134 has a first long axis direction $LX_{134}$ and a first short axis direction $SX_{134}$ respectively on a long side LS and a short side SS of the light-emitting surface 134t. Specifically, the light guide plate 134 has a first long axis direction $LX_{134}$ extending parallel to the long side LS of the light guide plate 134 and a first short axis direction $SX_{134}$ extending parallel to the short side SS of the light guide plate 134. In some embodiments, the first long axis direction $LX_{134}$ is extended along the long side LS of the light guide plate 134, and the first short axis direction $SX_{134}$ is extended along the short side SS of the light guide plate 134. The first light-emitting element 132A has a second long axis direction $LX_A$ perpendicular to the first light-emitting axis EX1, and the second light-emitting element 132B has a third long axis direction $LX_B$ perpendicular to the second light-emitting axis EX2, in which the second long axis direction $LX_A$ and the third long axis direction $LX_B$ are parallel to each other and coincide with each other. As shown in FIG. 3, the second long axis direction $LX_A$ and the first long axis direction $LX_{134}$ are perpendicular to each other, and the third long axis direction $LX_B$ and the first long axis direction $LX_{134}$ are perpendicular to each other.

Figure 4:
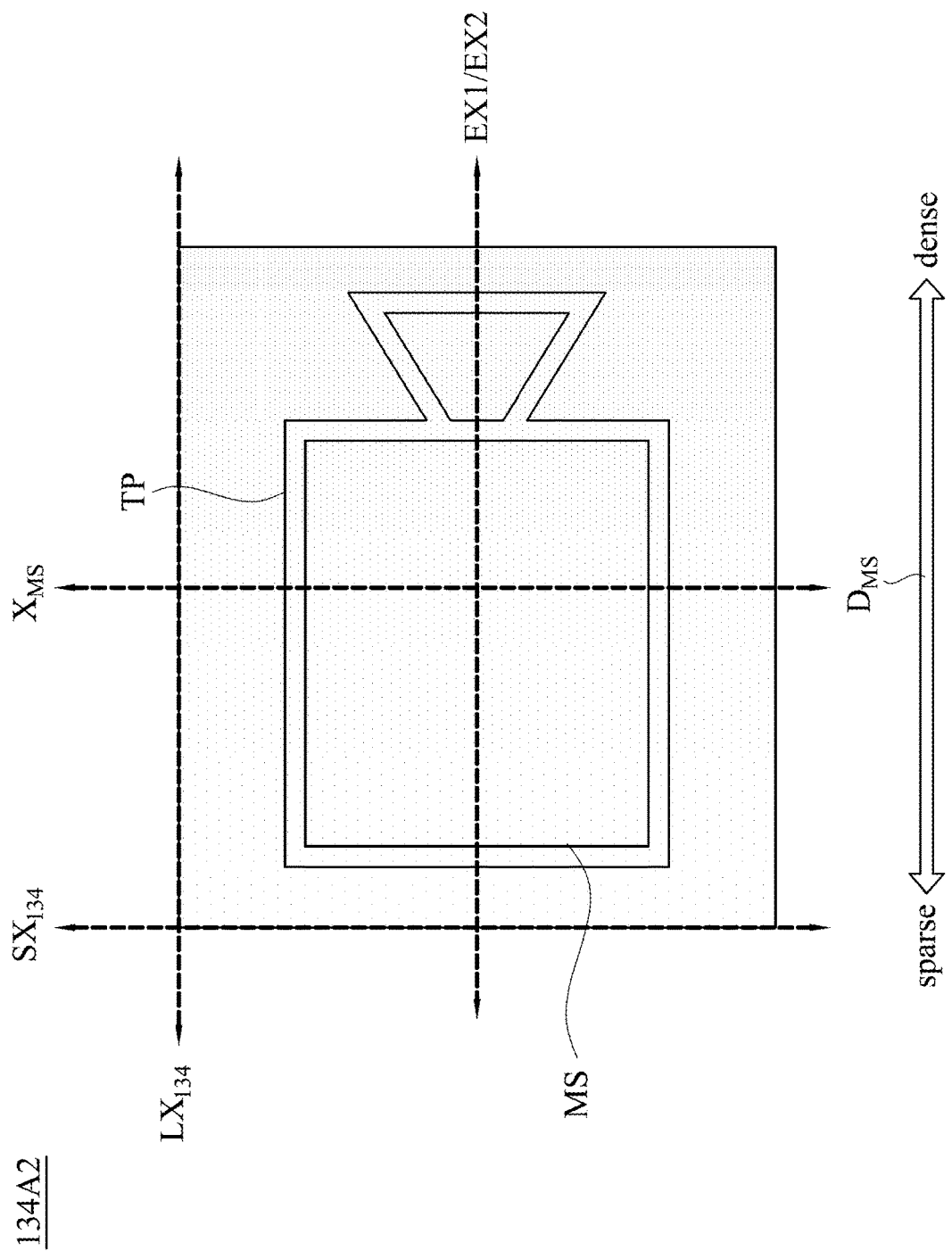
FIG. 4 is a front view of a light-emitting dotting area in accordance with an embodiment of the present disclosure.

Reference is made to FIG. 4. FIG. 4 is a front view of the light-emitting dotting area 134A2 in accordance with an embodiment of the present disclosure. FIG. 4 is a partial enlarged view of FIG. 3. As shown in FIG. 4, in this embodiment, the dots MS have a density, and the density of the dots MS varies along the distributing direction $D_{MS}$. As shown in FIG. 3 and FIG. 4, the density of dots MS gradually increases along the distributing direction $D_{MS}$ away from the first light-emitting element 132A or the second light-emitting element 132B, and the distributing direction $D_{MS}$ is parallel to the first light-emitting axis EX1 or the second light-emitting axis EX2. In other words, the density of the dots MS gradually increases along the direction away from the short side SS. Specifically, the dots MS are sparsely distributed on a side close to the first light-emitting element 132A or the second light-emitting element 132B, and the dots MS are densely distributed on a side away from the first light-emitting element 132A or the second light-emitting element 132B. Moreover, the dots MS have the same density in an extending direction $X_{MS}$ perpendicular to the first light-emitting axis EX1 or the second light-emitting axis EX2, as shown in FIG. 4. This causes the brightness at one end of the light transmissive portion TP away from the first light-emitting element 132A or the second light-emitting element 132B is not reduced due to attenuation of light energy when the light L emitted by the first light-emitting element 132A or the second light-emitting element 132B continues to propagate and the energy is attenuated.

Figure 5:
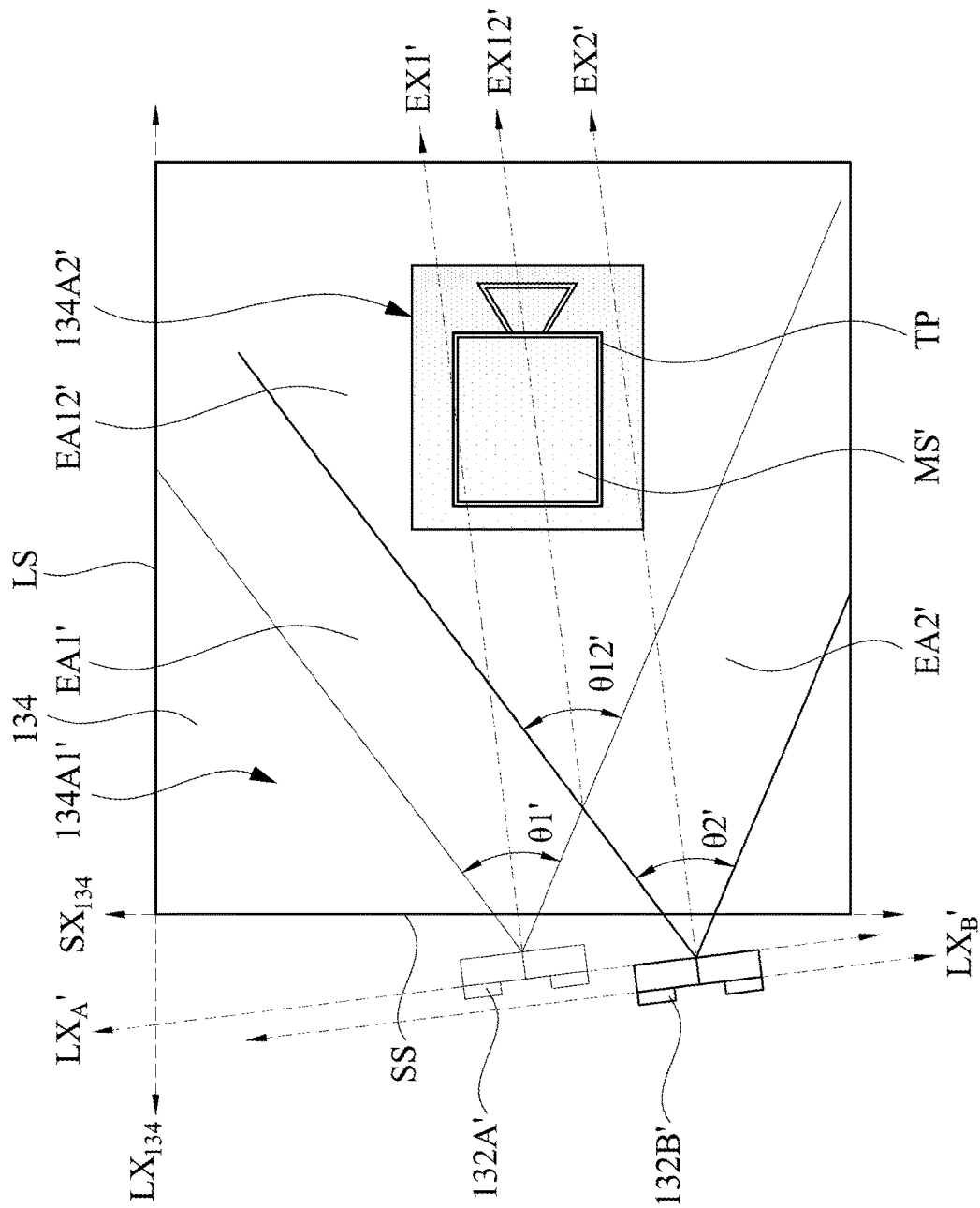
FIG. 5 is a front view of the first light-emitting element, the second light-emitting element, the light mixing zone and the light-emitting dotting area in accordance with an embodiment of the present disclosure.

Reference is made to FIG. 5. FIG. 5 is a front view of the first light-emitting element 132A', the second light-emitting element 132B', the light mixing zone 134A1', and the light-emitting dotting area 134A2' of the backlight module 130 in accordance with an embodiment of the present disclosure. The structural configuration of the backlight module 130 in FIG. 5 is substantially similar to the structural configuration of the backlight module 130 in FIG. 3. The difference is that the backlight module 130 in FIG. 5 includes a first light-emitting element 132A' and a second light-emitting element 132B', and the first light-emitting element 132A' and the second light-emitting element 132B' in FIG. 5 are all rotated by an angle relative to the first light-emitting element 132A and the second light-emitting element 132B in FIG. 3. As shown in FIG. 5, the first light-emitting element 132A' forms a first illuminating zone EA1' along a first light-emitting axis EX1' with a first light-emitting angle θ1', and the second light-emitting element 132B' forms a second illuminating zone EA2' along a second light-emitting axis EX2' with a second light-emitting angle θ2'. The area where the first illuminating zone EA1' and the second illuminating zone EA2' overlap forms an overlapping illuminating zone EA12'. As shown in FIG. 5, the overlapping illuminating zone EA12' has an overlapping light-emitting angle θ12' and an overlapping illuminating zone light-emitting axis EX12'. The light-emitting dotting area 134A2' is located within the range where the first illuminating zone EA1' and the second illuminating zone EA2' overlap (for example, located within the overlapping illuminating zone EA12'). In this case, when the light transmissive portion TP is adjacent to the edge of the light guide plate 134, the first light-emitting element 132A' and the second light-emitting element 132B' are rotated by an angle, and the light-emitting dotting area 134A2' is still located within the range where the first illuminating zone EA1' and the second illuminating zone EA2' overlap, so that the light transmissive portion TP can emit uniform light when the light transmissive portion TP illuminated by light L of different colors.

Reference is made again to FIG. 5. The first light-emitting element 132A' has a second long axis direction $LX_A'$ perpendicular to the first light emitting axis EX1'. The second light-emitting element 132B' has a third long axis direction $LX_B'$ perpendicular to the second light-emitting axis EX2', in which the second long axis direction $LX_A'$ and the third long axis direction $LX_B'$ are parallel to but do not coincide with each other. As shown in FIG. 5, the second long axis direction $LX_A'$ and the first long axis direction $LX_{134}$ form an acute angle.

In some embodiments, the second long axis direction $LX_A'$ and the third long axis direction $LX_B'$ respectively form an acute angle with the first long axis direction $LX_{134}$, and the second long axis direction $LX_A'$ is not parallel to the third long axis direction $LX_B'$.

Figure 6:
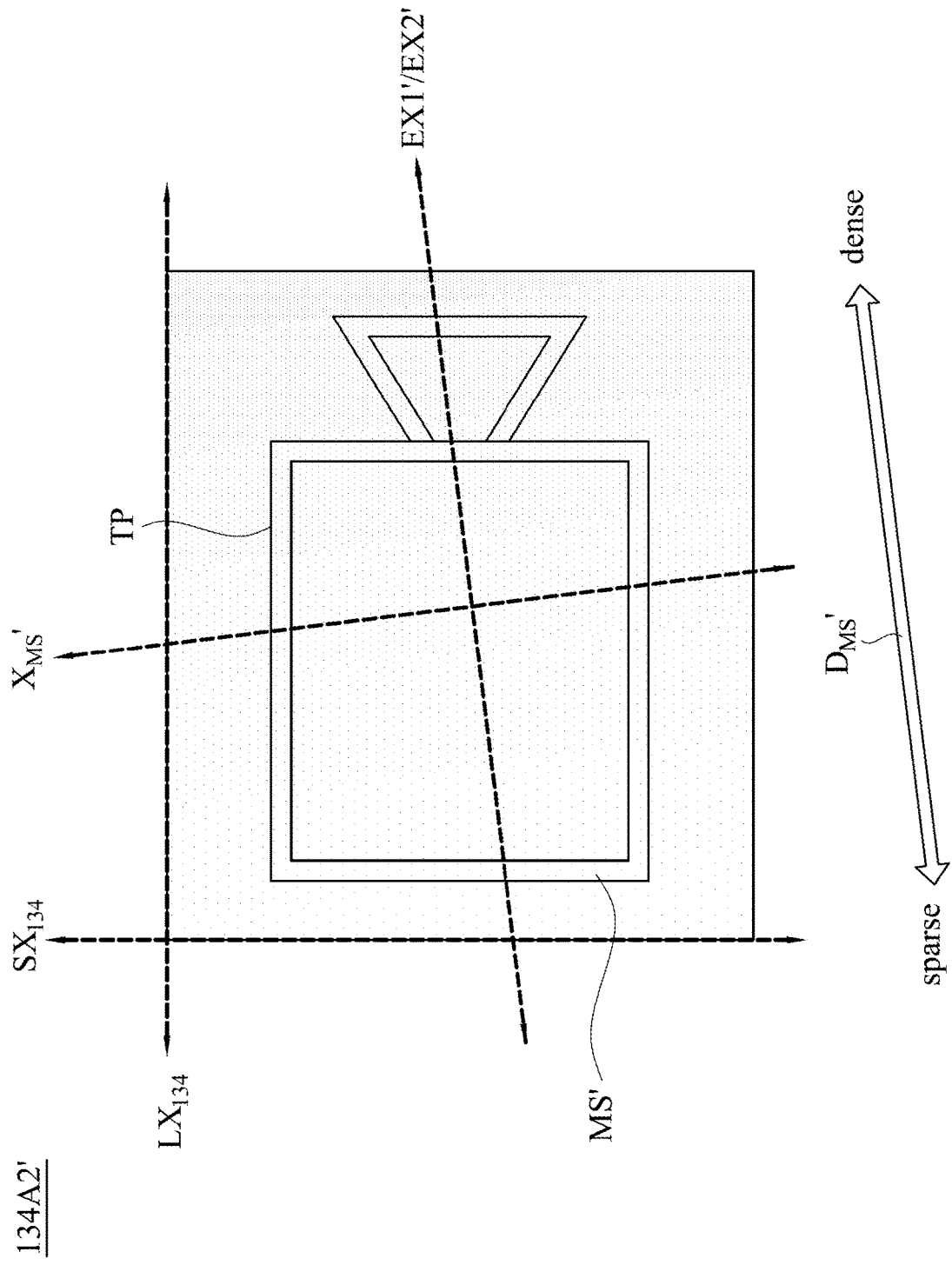
FIG. 6 is a front view of the light-emitting dotting area in accordance with an embodiment of the present disclosure.

Reference is made to FIG. 6. FIG. 6 is a front view of the light-emitting dotting area 134A2' in accordance with an embodiment of the present disclosure. FIG. 6 is a partial enlarged view of FIG. 5. As shown in FIG. 6, in this embodiment, the dots MS' have a density, and the density of the dots MS' varies along the distributing direction $D_{MS}'$. As shown in FIG. 5 and FIG. 6, the density of dots MS' gradually increases along the distributing direction $D_{MS}'$ away from the first light-emitting element 132A' or the second light-emitting element 132B', and the distributing direction $D_{MS}'$ is parallel to the first light-emitting axis EX1' or the second light-emitting axis EX2'. In other words, the density of the dots MS' gradually increases in the direction away from the short side SS. In other words, the distributing direction $D_{MS}'$ forms an acute angle with the first long axis direction $LX_{134}$ (for example, the distributing direction $D_{MS}'$ is not parallel to the first long axis direction $LX_{134}$). The density of the dots MS' is the same in the extending direction $X_{MS}'$ perpendicular to the first light-emitting axis EX1' or the second light-emitting axis EX2', as shown in FIG. 6. This allows the light transmissive portion TP to optimize uniform light emission when the light L emitted by the first light-emitting element 132A' or the second light-emitting element 132B' continues to propagate and causes energy attenuation.

Figure 7:
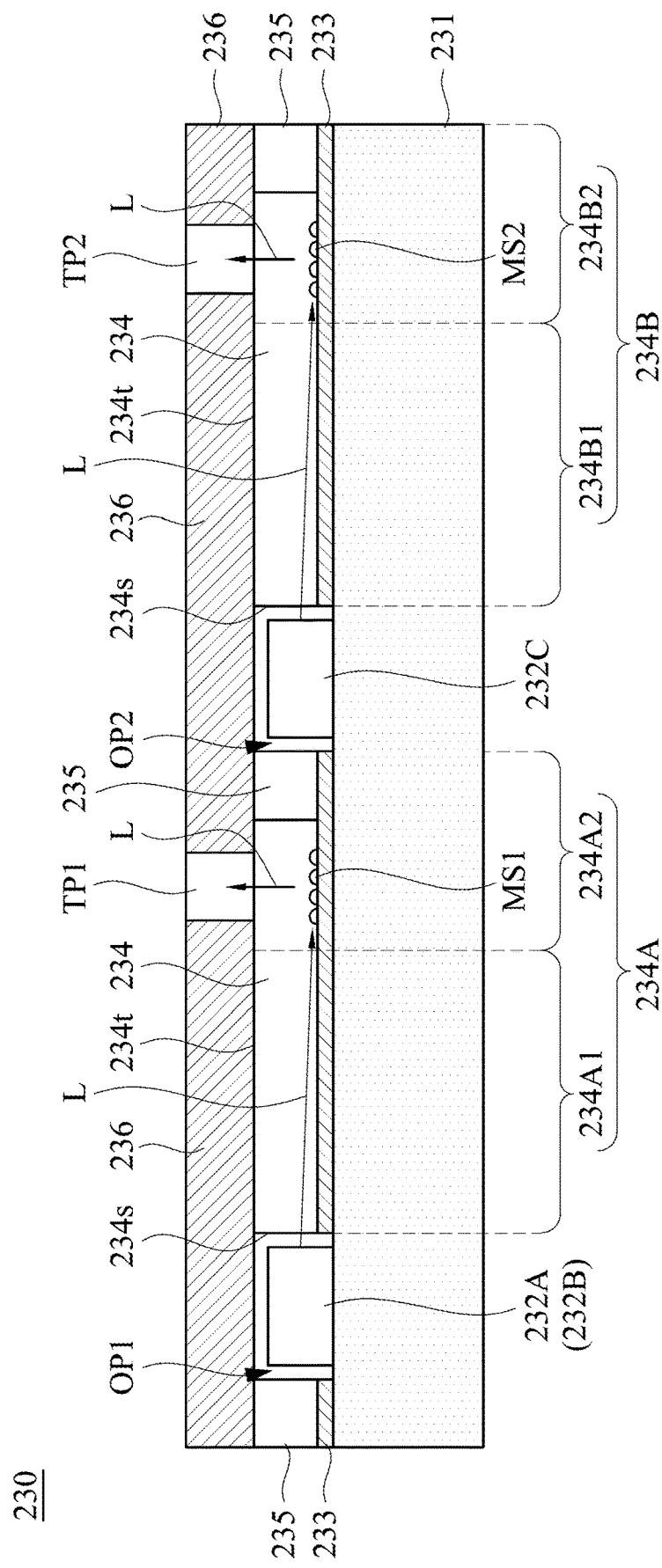
FIG. 7 is a cross-sectional view of the backlight module in accordance with an embodiment of the present disclosure.
Figure 8:
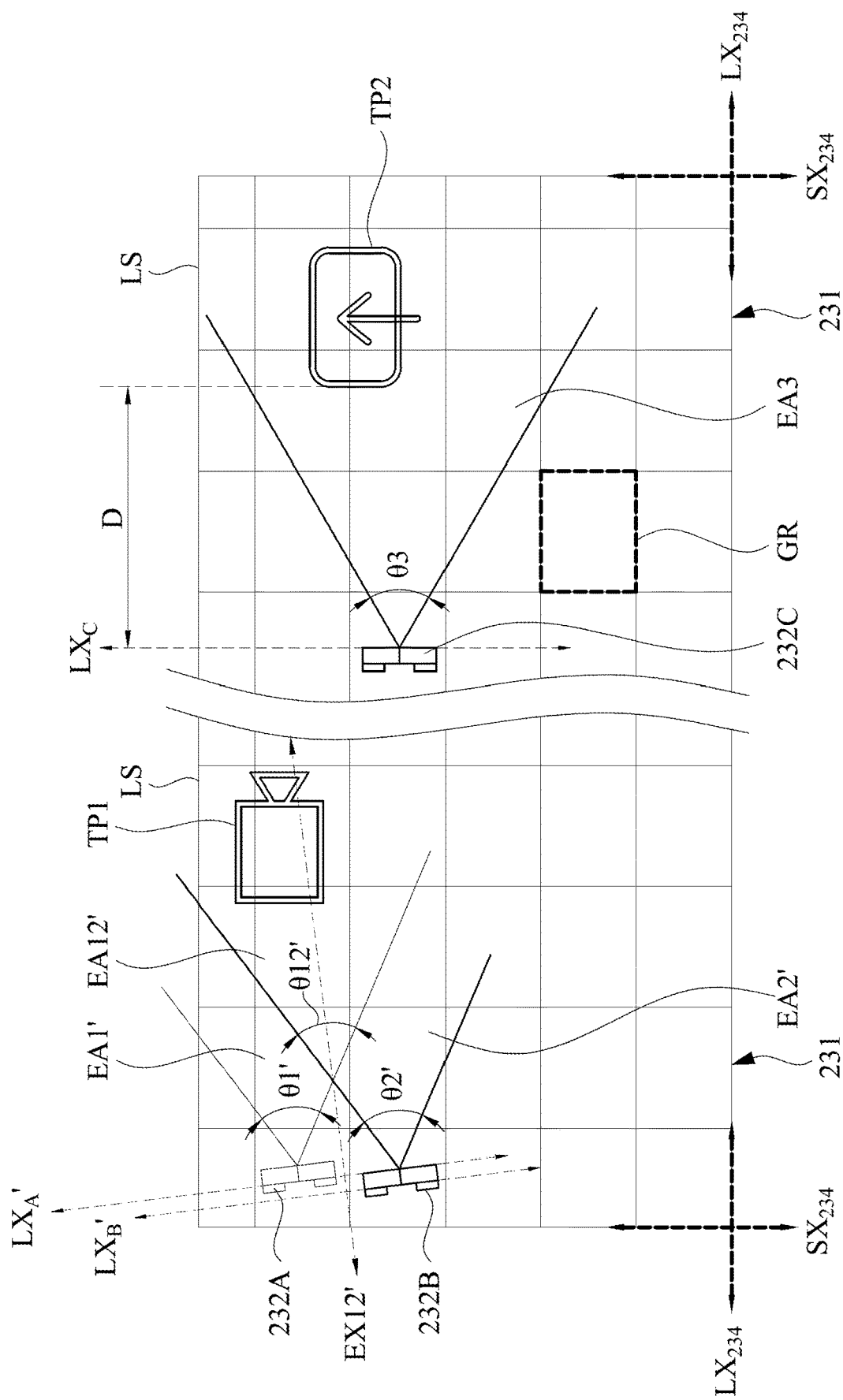
FIG. 8 is a front view of a light-emitting element and a light transmissive portion in accordance with an embodiment of the present disclosure.

Reference is made to FIG. 7 and FIG. 8. FIG. 7 is a cross-sectional view of the backlight module 230 in accordance with an embodiment of the present disclosure. FIG. 8 is a front view of the backlight module 230 in accordance with an embodiment of the present disclosure. FIG. 7 and FIG. 8 disclose an example of the backlight module 230 that simultaneously includes a first light-emitting element 232A and a second light-emitting element 232B that are rotated by an angle to emit light and a third light-emitting element 232C that emits light parallel to the first long axis direction $LX_{234}$ of the light guide plate 234. This embodiment will be described in detail below.

Reference is made again to FIG. 7. As shown in FIG. 7, in this embodiment, the backlight module 230 includes a circuit board 231, a first light-emitting element 232A, a second light-emitting element 232B, a third light-emitting element 232C, a reflective sheet 233, light guide plates 234, light-partitioning portions 235 and a light-shielding plate 236. It should be noted that since the structural configuration of the backlight module 230 in FIG. 7 is substantially similar to the structural configuration of the backlight module 130 in FIG. 2, the discussion about similar elements will not be repeated herein. As shown in FIG. 7, the accommodating area OP1 is located next to one of the light guide plates 234, and the aforementioned light guide plate 234 has a first light guide area 234A. The accommodating area OP2 is located next to the other light guide plate 234, and the aforementioned the other light guide plate 234 has a second light guide area 234B. The first light guide area 234A is divided into a first light mixing zone 234A1 and a first light-emitting dotting area 234A2, and the second light guide area 234B is divided into a second light mixing zone 234B1 and a second light-emitting dotting area 234B2. As shown in FIG. 7, the first light-emitting dotting area 234A2 includes a plurality of first dots MS1, and the second light-emitting dotting area 234B2 includes a plurality of second dots MS2. The first dots MS1 and the second dots MS2 are non-evenly distributed within the first light-emitting dotting area 234A2 and the second light-emitting dotting area 234B2 respectively. The first light-emitting element 232A and the second light-emitting element 232B are disposed on the circuit board 231 and pass through the accommodating area OP1, and the first light-emitting element 232A and the second light-emitting element 232B emit light toward the first light-emitting dotting area 234A2. The third light-emitting element 232C is disposed on the circuit board 231 and passes through the accommodating area OP2, and the third light-emitting element 232C emits light toward the second light-emitting dotting area 234B2. The two light guide plates 234 are respectively embedded between the light-partitioning portions 235. The light-shielding plate 236 is disposed over the circuit board 231 and has a first light transmissive portion TP1 and a second light transmissive portion TP2. The first light-emitting dotting area 234A2 is disposed corresponding to the first light transmissive portion TP1, and the accommodating area OP1 is separated from the first light-emitting dotting area 234A2. The second light-emitting dotting area 234B2 is disposed corresponding to the second light transmissive portion TP2, and the accommodating area OP2 is separated from the second light-emitting dotting area 234B2. In some embodiments, each light guide plate 234 has a light incident surface 234s and a light-emitting surface 234t.

Reference is made again to FIG. 8. FIG. 8 further illustrates that the backlight module 230 of the present disclosure includes the first light-emitting element 232A and the second light-emitting element 232B located over the circuit board 231 and emit light along a light-emitting axis that is not parallel to the first long axis direction $LX_{234}$ and the third light-emitting element 232C emitting light along a light emitting axis parallel to the direction of the first long axis direction $LX_{234}$. FIG. 8 further illustrates a plurality of grid areas GR including induction coils (not shown) on the circuit board 231. Specifically, a complete grid area GR is depicted as the range of the dotted block in FIG. 8. The complete grid area GR is configured to accommodate a single light-emitting element. In addition, there is also an incomplete grid area GR at the edge of the circuit board 231 (or the light guide plate 234). The incomplete grid area GR is not allowed to accommodate any light-emitting element. As shown in FIG. 7 and FIG. 8, the first light-emitting element 232A emits light toward the first light-emitting dotting area 234A2 with a first light-emitting angle θ1' to light up the first light transmissive portion TP1 and form the first illuminating zone EA1'. The second light-emitting elements 232B emits light toward the first light-emitting dotting area 234A2 with a second light-emitting angle θ2' to light up the first light transmissive portion TP1 and form a second illuminating zone EA2'. The third light-emitting element 232C emits light toward the first light-emitting dotting area 234B2 with a third light-emitting angle θ3 to light up the second light transmissive portion TP2 and form the third illuminating zone EA3. As shown in FIG. 7 and FIG. 8, the second light transmissive portion TP2 is within the range of the second light-emitting dotting area 234B2, and the second light-emitting dotting area 234B2 is located within the range of the third illuminating zone EA3. In practical applications, as shown in FIG. 8, the first light transmissive portion TP1 is adjacent to the edge of the backlight module 230 (for example, the long side LS of the light guide plate 234), and the first light-emitting element 232A or the second light-emitting element 232B cannot be disposed in the grid area GR closest to the edge of the backlight module 230 due to space limitations. Specifically, because the grid area GR located at the edge of the circuit board 231 is not a complete grid area GR as shown by the dotted block, the grid area GR located at the edge of the backlight module 230 cannot accommodate any light-emitting element. Accordingly, the first light-emitting element 232A and the second light-emitting element 232B can be rotated by an angle such that the first light transmissive portion TP1 is located within the overlapping illuminating zone EA12', and further allows the brightness of one end of the first light transmissive portion TP1 away from the first light-emitting element 232A or the second light-emitting element 232B will not be reduced due to the energy attenuation of the light L.

Reference is made again to FIG. 8. As shown in FIG. 8, the first light-emitting element 232A has a second long axis direction $LX_A'$ that is not parallel to the first long axis direction $LX_{234}$. The second light-emitting element 232B has a third long axis direction $LX_B'$ that is not parallel to the first long axis direction $LX_{234}$. The third light-emitting element 232C has a fourth long axis direction $LX_C$ perpendicular to the first long axis direction $LX_{234}$ and parallel to the first short axis direction $SX_{234}$.

In some embodiments, as shown in FIG. 8, a shortest distance D between the third light-emitting element 232C and the second light transmissive portion TP2. In some embodiments, the distance D is greater than 5 mm. In some embodiments, the distance between the first light-emitting element 232A and the first light transmissive portion TP1 or the distance between the second light-emitting element 232B and the first light transmissive portion TP1 are also greater than 5 mm. In some embodiments, the distance D is a light mixing distance.

Figure 9:
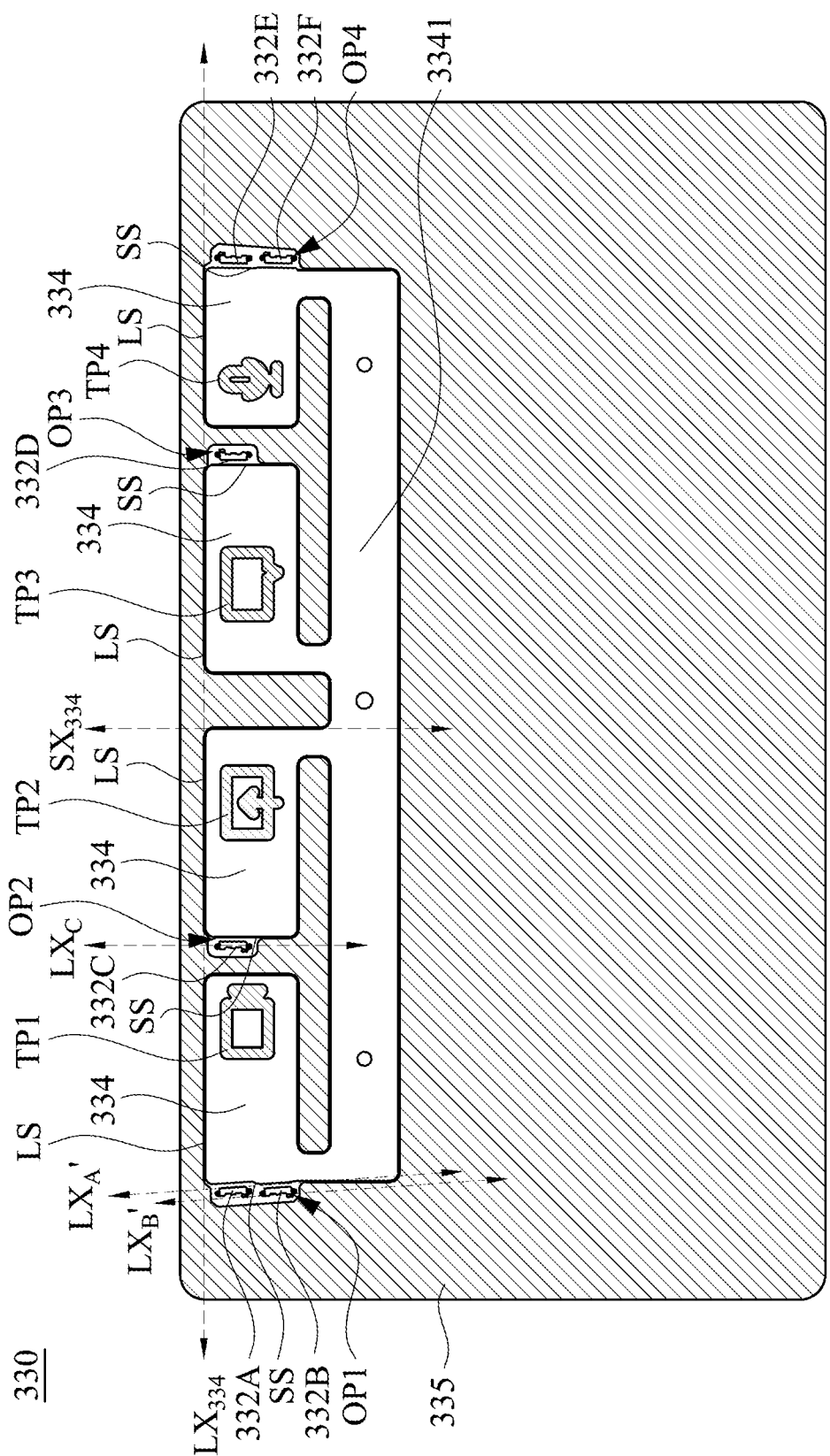
FIG. 9 is a front view of a light-shielding plate and a light guide plate in accordance with an embodiment of the present disclosure.

Reference is made to FIG. 9. FIG. 9 is a front view of the light-partitioning portion 335 and the light guide plate 334 of the backlight module 330 in accordance with an embodiment of the present disclosure. FIG. 9 discloses an example of a backlight module 330 that at least includes a first light-emitting element 332A and a second light-emitting element 332B that are rotated by an angle to emit light and a third light-emitting element 332C that emits light parallel to the first long axis direction $LX_{334}$ of the light guide plate 334. In this embodiment, the backlight module further includes a connecting portion 3341. The connecting portion 3341 connects the light guide plates 334. In some embodiments, the light guide plates 334 and the connecting portion 3341 are integrally formed. In this embodiment, the backlight module 330 further includes a first light transmissive portion TP1, a second light transmissive portion TP2, a third light transmissive portion TP3, and a fourth light transmissive portion TP4 with different button icons. The white area in FIG. 9 depicts the outlines of the light guide plates 334 and the outlines of the accommodating area OP1, accommodating area OP2, accommodating area OP3, and accommodating area OP4. This embodiment will be described in detail below.

As shown in FIG. 9, the backlight module 330 includes a first light-emitting element 332A and a second light-emitting element 332B passing through the accommodating area OP1, a third light-emitting element 332C passing through the accommodating area OP2, a fourth light-emitting element 332D passing through the accommodating area OP3, and the fifth light-emitting element 332E and the sixth light-emitting element 332F passing through the accommodating area OP4. The second long axis direction $LX_A'$ of the first light-emitting element 332A and the third long axis direction $LX_B'$ of the second light-emitting element 332B form an acute angle with the first long axis direction $LX_{334}$. The fourth long axis direction $LX_C$ of the third light-emitting element 332C is perpendicular to the first long axis direction $LX_{334}$ and parallel to the first short axis direction $SX_{334}$.

In some other embodiments, the third light-emitting element 332C can be rotated by an angle similar to that shown in FIG. 5 and FIG. 6 to light up the second light transmissive portion TP2. Specifically, the fourth long axis direction $LX_C$ and the first long axis direction $LX_{334}$ form an acute angle.

In some embodiments, when the fourth long axis direction $LX_C$ is perpendicular to the first long axis direction $LX_{334}$, the density of the second dots MS2 gradually increases along the distributing direction away from the third light-emitting element 332C, and the distributing direction is parallel to the first long axis direction $LX_{334}$. In some other embodiments, when the fourth long axis direction $LX_C$ and the first long axis direction $LX_{334}$ form an acute angle, the distributing direction of the density of the second dots MS2 forms an acute angle with the first long axis direction $LX_{334}$.

Figure 10:
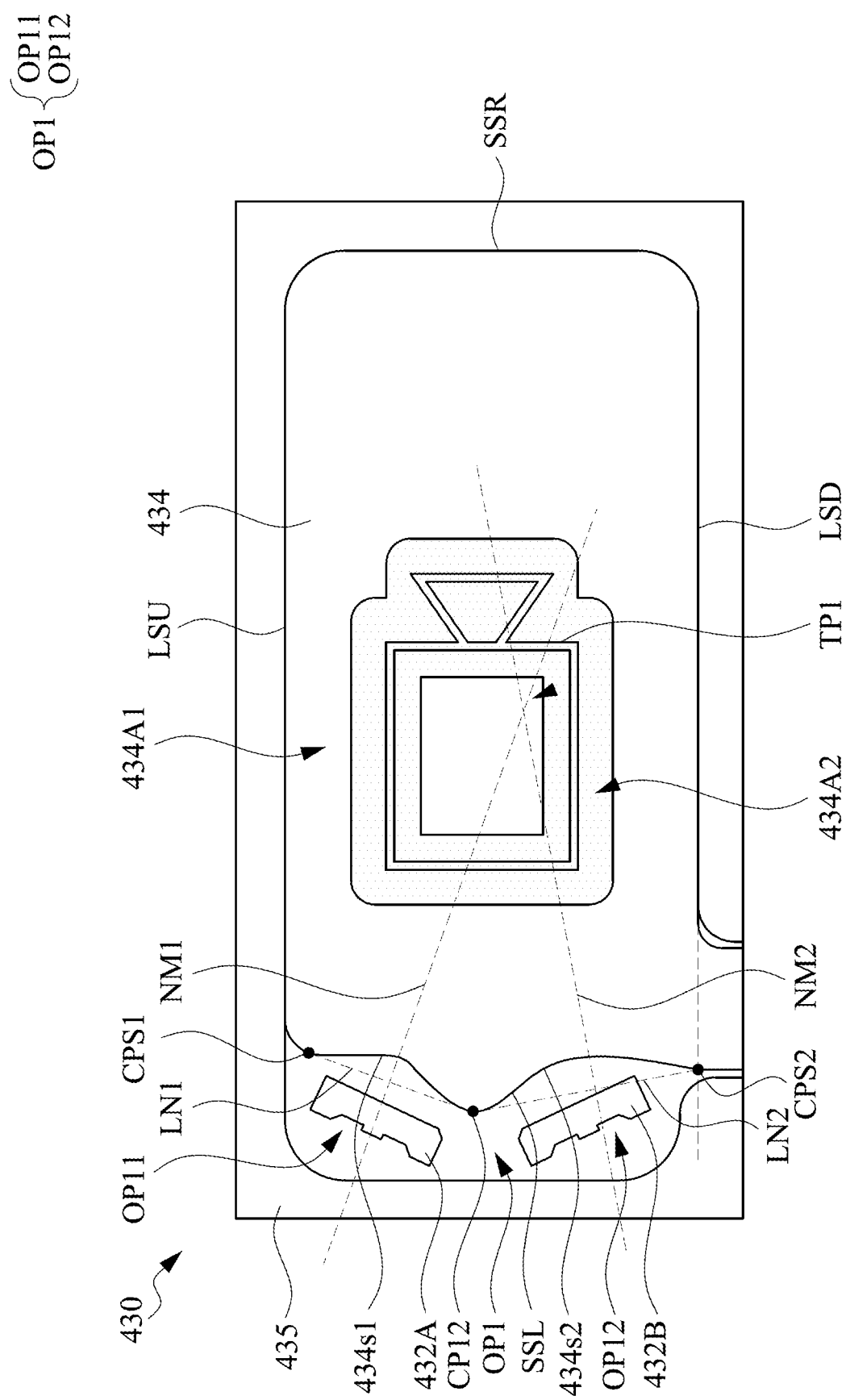
FIG. 10 is a front view of a light-shielding plate and a light guide plate in accordance with an embodiment of the present disclosure.

Reference is made to FIG. 10. FIG. 10 is a front view of a part of the backlight module 430 in accordance with an embodiment of the present disclosure. It should be noted that the structural configuration of the backlight module 430 is generally similar to the structural configuration of the backlight module 130, the backlight module 230, and the backlight module 330, so the connection relationship between the elements will not be described again herein. As shown in FIG. 10, in this embodiment, the backlight module 430 includes a first light-emitting element 432A, a second light-emitting element 432B, a light guide plate 434, a light-partitioning portion 435, and a first light transmissive portion TP1. The light guide plate 434 is disposed with an accommodating area OP1 that is hollowed, and the first light-emitting element 432A and the second light-emitting element 432B pass through the accommodating area OP1. The light guide plate 434 has a first light incident surface 434s1 and a second light incident surface 434s2 respectively facing the first light-emitting element 432A and the second light-emitting element 432B. The light guide plate 434 has a light mixing zone 434A1 and a light-emitting dotting area 434A2. In more detail, the light-emitting dotting area 434A2 is depicted in dotted shading, and the area outside the light-emitting dotting area 434A2 is the light mixing zone 434A1.

Reference is made again to FIG. 10. In some embodiments, the light guide plate 434 has a long side LSU, a short side SSL, a long side LSD, and a short side SSR, such that the light guide plate 434 has a generally rectangular shape, as shown in FIG. 10. In some embodiments, the first light incident surface 434s1 and the second light incident surface 434s2 are disposed adjacent to the short side SSL of the light guide plate 434. In some embodiments, the first light incident surface 434s1 and the second light incident surface 434s2 are located on (or, directly on) the short side SSL of the light guide plate 434. In some embodiments, there is a dividing point CP12 locating at where the first light incident surface 434s1 and the second light incident surface 434s2 are connected, there is a dividing point CPS1 locating at where the first light incident surface 434s1 and the long side LSU are connected, and there is a dividing point CPS2 locating at where the second light incident surface 434s2 intersects an extending line of the long side LSD. As shown in FIG. 10, the dividing point CP12 is connected to the dividing point CPS1 to form a connecting line LN1, and the perpendicular bisector of the connecting line LN1 defines a first normal line NM1. The dividing point CP12 is connected to the dividing point CPS2 to form a connecting line LN2, and the perpendicular bisector of the connecting line LN2 defines a second normal line NM2. In this embodiment, the structural configuration of the first light incident surface 434s1 and the second light incident surface 434s2 shown in FIG. 10 renders the first normal line NM1 located on the first light incident surface 434s1 and the second normal line NM2 located on the second light incident surface 434s2 passing through the light-emitting dotting area 434A2.

In some embodiments, the first normal line NM1 and the second normal line NM2 are not parallel. In some embodiments, the first normal line NM1 and the second normal line NM2 respectively form an acute angle with the long side LSU (or long side LSD) of the light guide plate 434.

In some embodiments, the backlight module 430 includes a light-shielding plate similar to the light-shielding plate 136 or the light-shielding plate 236 described above. Since the configuration of the light-shielding plate in the backlight module 430 is similar to that of the light-shielding plate 136 or the light-shielding plate 236, details will not be described herein. As shown in FIG. 10, in some embodiments, the accommodating area OP1 can be further divided into an accommodating area OP11 and an accommodating area OP12. Specifically, the aforementioned light-shielding plate, the first light incident surface 434s1, and the light-partitioning portion 435 jointly form an accommodating area OP11, and the aforementioned light-shielding plate, the second light incident surface 434s2, and the light-partitioning portion 435 jointly form an accommodating area OP12. In some embodiments, the accommodating area OP11 and the accommodating area OP12 communicate to each other, as shown in FIG. 10. In some other embodiments, the accommodating area OP11 and the accommodating area OP12 are not communicated to each other. Specifically, when the dividing point CP12 contacts the light-partitioning portion 435, the accommodating area OP11 and the accommodating area OP12 are separated, thereby causing the accommodating area OP11 and the accommodating area OP12 not being communicated to each other.

In some embodiments, the accommodating area OP11 and the accommodating area OP12 may also be disposed directly through the light guide plate 434 instead of being formed by being surrounded by the light-partitioning portion 435. Regardless of whether the accommodating area OP11 and the accommodating area OP12 are formed by passing through a single element or formed by plural surrounding elements, these do not deviate from the spirit and scope of the present disclosure.

In some embodiments, as shown in FIG. 10, the first light incident surface 434s1 is recessed away from the first light-emitting element 432A, and the second light incident surface 434s2 is recessed away from the second light-emitting element 432B. In some embodiments, the first light incident surface 434s1 and the second light incident surface 434s2 may be, for example, arc-shaped surfaces or other similar curved surfaces.

In some embodiments, as shown in FIG. 10, the light-emitting dotting area 434A2 is distributed based on the shape of the first light transmissive portion TP1. Specifically, the shape of the light-emitting dotting area 434A2 is similar to that of the first light transmissive portion TP1. As shown in FIG. 10, when viewed from the front, the first light transmissive portion TP1 is within the range of the light-emitting dotting area 434A2.

With the above structural configuration, as shown in FIG. 10, when the first light-emitting element 432A and the second light-emitting element 432B emit light toward the first light incident surface 434s1 and the second light incident surface 434s2 respectively, the first light incident surface 434s1 and the second light incident surface 434s2 can diffuse the light. Since the first light incident surface 434s1 and the second light incident surface 434s2 can diffuse the light, the distance between the first light-emitting element 432A and the first light transmissive portion TP1 or the distance between the second light-emitting element 432B and the first light transmissive portion TP1 can be shortened (i.e., the light mixing distance can be shortened) to achieve the effect of saving space. In addition, the structural configuration of the first light incident surface 434s1 and the second light incident surface 434s2 causes that the light can be diffused through the first light incident surface 434s1 and the second light incident surface 434s2 regardless of the orientation that the first light-emitting element 432A and the second light-emitting element 432B facing the first light incident surface 434s1 and the second light incident surface 434s2 to emit light respectively.

Figure 11:
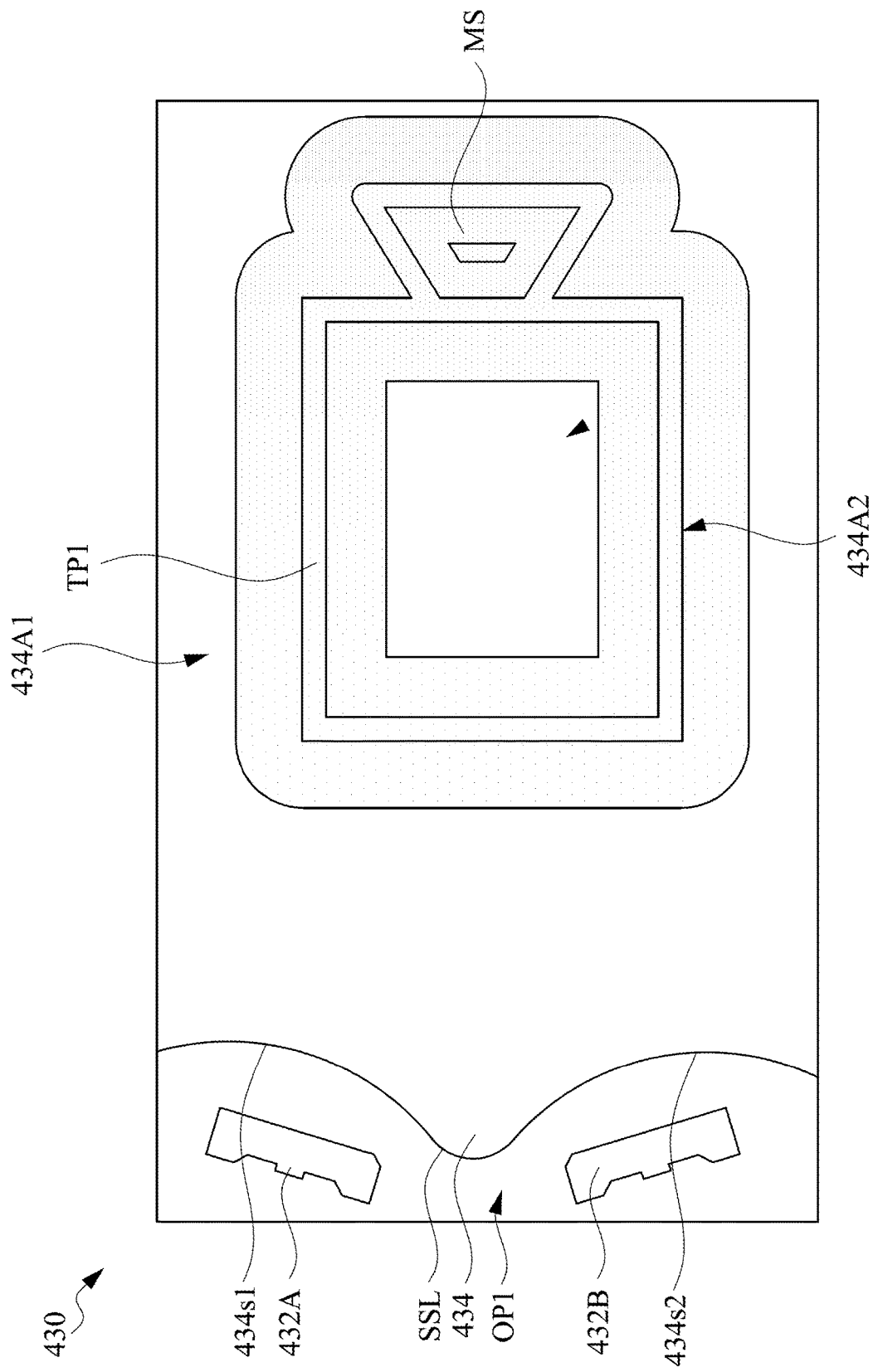
FIG. 11 is a front view of the light-shielding plate and the light guide plate in accordance with another embodiment of the present disclosure.

Reference is made to FIG. 11. FIG. 11 is a front view of a part of the backlight module 430 in accordance with another embodiment of the present disclosure. The structural configuration of the backlight module 430 in FIG. 11 is substantially similar to the structural configuration of the backlight module 430 in FIG. 10. The difference is that the light-emitting dotting area 434A2 of the backlight module 430 includes the dots MS that are non-evenly distributed. For example, as shown in FIG. 11, the density of the dots MS gradually increases along the direction away from the first light-emitting element 432A or the second light-emitting element 432B. In some embodiments, the density of dots MS gradually increases in a direction away from the short side SSL.

In some other embodiments, the first light incident surface 434s1 and the second light incident surface 434s2 may be, for example, planar surfaces. In other words, in this case, the first light incident surface 434s1 and the second light incident surface 434s2 coincide with the connecting line LN1 and the connecting line LN2 respectively.

Figure 12:
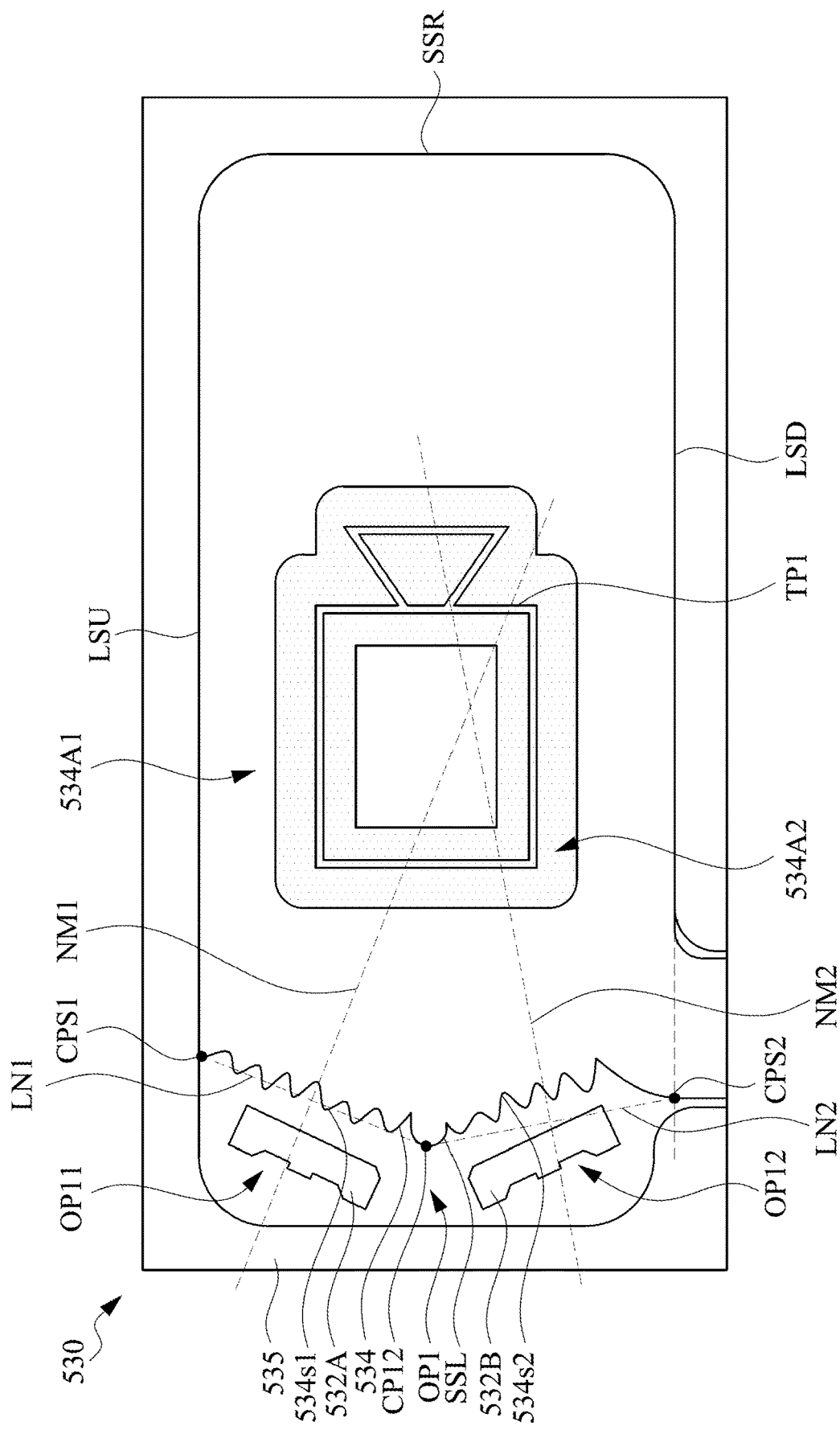
FIG. 12 is a front view of the light-shielding plate and the light guide plate in accordance with an embodiment of the present disclosure.

Reference is made to FIG. 12. FIG. 12 is a front view of a part of the backlight module 530 in accordance with an embodiment of the present disclosure. It should be noted that the structural configuration of the backlight module 530 is substantially similar to the structural configuration of the backlight module 430, so the connection relationship between the elements will not be described again herein. The difference between the backlight module 530 and the backlight module 430 is that the first light incident surface 534s1 and the second light incident surface 534s2 of the backlight module 530 are rough surfaces instead of curved surfaces. As shown in FIG. 12, in this embodiment, the backlight module 530 includes a first light-emitting element 532A, a second light-emitting element 532B, a light guide plate 534, a light-partitioning portion 535, and a first light transmissive portion TP1. The light guide plate 534 has a first light incident surface 534s1 and a second light incident surface 534s2 respectively facing the first light-emitting element 532A and the second light-emitting element 532B. The light guide plate 534 has a light mixing zone 534A1 and a light-emitting dotting area 534A2.

In some embodiments, as shown in FIG. 12, the first light incident surface 534s1 and the second light incident surface 534s2 may be, for example, zigzag surfaces or other similar rough surfaces.

In some embodiments, as shown in FIG. 12, the light-emitting dotting area 534A2 is also distributed based on the shape of the first light transmissive portion TP1, and when viewed from the front, the first light transmissive portion TP1 is within the range of the light-emitting dotting area 534A2.

With the above structural configuration, as shown in FIG. 12, the first light incident surface 534s1 and the second light incident surface 534s2 can also diffuse the light when the first light-emitting element 532A and the second light-emitting element 532B emit light towards the first light incident surface 534s1 and the second light incident surface 534s2 that are rough. Since the first light incident surface 534s1 and the second light incident surface 534s2 can diffuse light, the distance between the first light-emitting element 532A and the first light transmissive portion TP1 or the distance between the second light-emitting element 532B and the first light transmissive portion TP1 can be shortened (i.e., the light mixing distance can be shortened) to achieve the effect of saving space.

Figure 13:
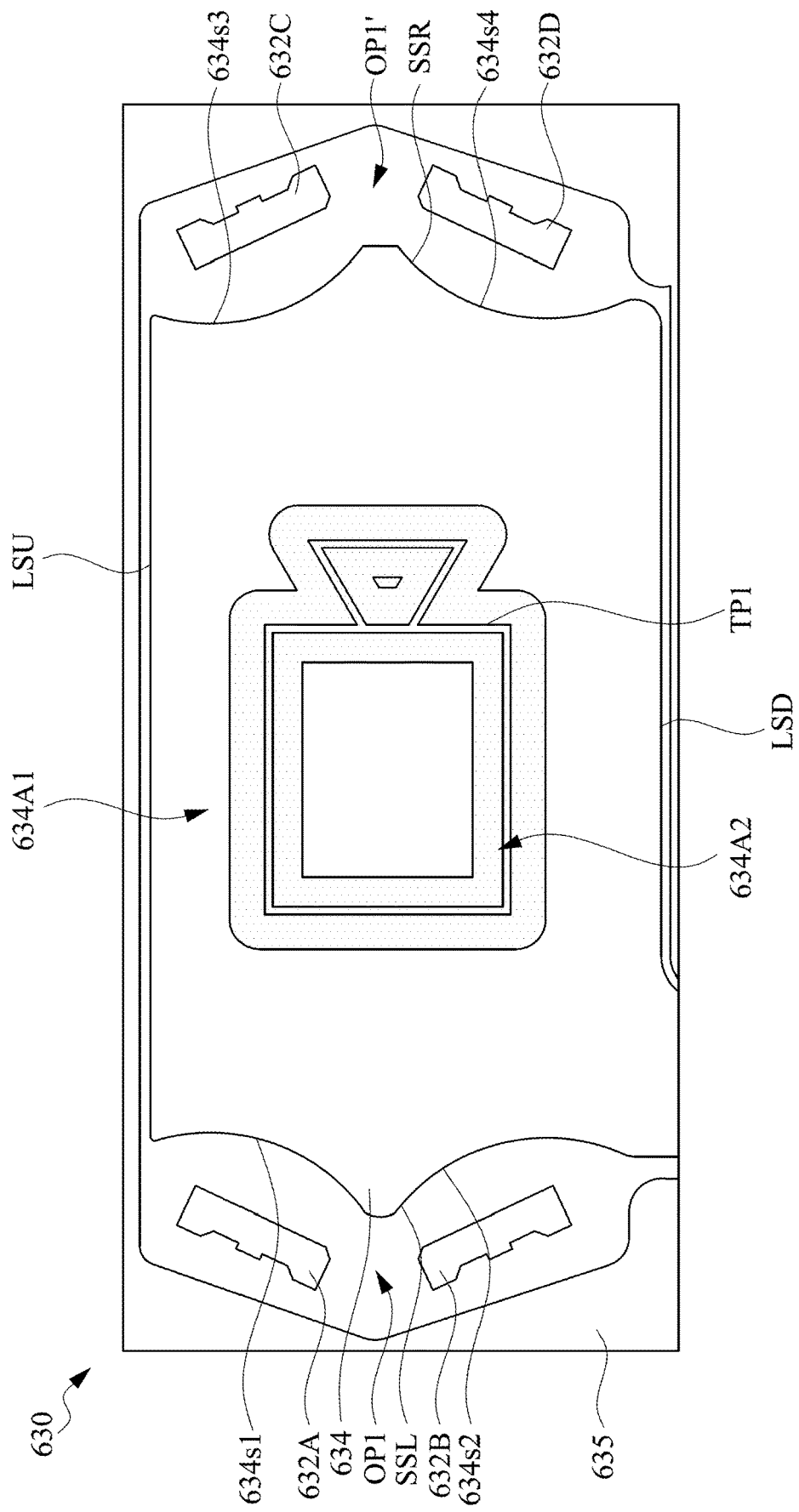
FIG. 13 is a front view of the light-shielding plate and the light guide plate in accordance with an embodiment of the present disclosure.

Reference is made to FIG. 13. FIG. 13 is a front view of a part of the backlight module 630 in accordance with an embodiment of the present disclosure. As shown in FIG. 13, in this embodiment, the backlight module 630 includes a first light-emitting element 632A, a second light-emitting element 632B, a second light-compensating element 632C, a first light-compensating element 632D, a light guide plate 634, a light-partitioning portion 635, and the first light transmissive portion TP1. The light guide plate 634 is disposed with an accommodating area OP1 and an accommodating area OP1' that are hollowed, and the accommodating area OP1 and the accommodating area OP1' are located on both sides of the light guide plate 634. The first light-emitting element 632A and the second light-emitting element 632B pass through the accommodating area OP1, and the second light-compensating element 632C and the first light-compensating element 632D pass through the accommodating area OP1'. Both the first light-emitting element 632A and the first light-compensating element 632D and both the second light-emitting element 632B and the second light-compensating element 632C emit light toward each other and simultaneously emit light toward the first light transmissive portion TP1. As shown in FIG. 13, the light guide plate 634 has a first light incident surface 634s1 and a second light incident surface 634s2, the third light incident surface 634s3, and the fourth light incident surface 634s4 respectively facing the first light-emitting element 632A, the second light-emitting element 632B, the second light-compensating element 632C, and the first light-compensating element 632D. The light guide plate 634 has a light mixing zone 634A1 and a light-emitting dotting area 634A2. In more detail, the light-emitting dotting area 634A2 is depicted in dotted shading, and the area outside the light-emitting dotting area 634A2 is the light mixing zone 634A1. In some embodiments, the first light-compensating element 632D and the first light-emitting element 632A are arranged along opposite sides of the light-emitting dotting area 634A2, and the second light-compensating element 632C and the second light-emitting element 632B are also arranged along the opposite sides of the light-emitting dotting area 634A2.

In some embodiments, the accommodating area OP1 and the accommodating area OP1' may also be disposed directly through the light guide plate 634 instead of being formed by being surrounded by the light-partitioning portion 635. Regardless of whether the accommodating area OP1 and the accommodating area OP1' are formed by passing through a single element or formed by plural surrounding elements, these do not deviate from the spirit and scope of the present disclosure.

In some embodiments, the first light-emitting element 632A and the first light-compensating element 632D emit light of the same color, the second light-emitting element 632B and the second light-compensating element 632C emit light of the same color, and the first light-emitting element 632A and the second light-emitting element 632B emit light of different colors. In some embodiments, the first light-emitting element 632A and the first light-compensating element 632D emit light at the same time, the second light-emitting element 632B and the second light-compensating element 632C emit light at the same time, and the first light-emitting element 632A and the second light-emitting element 632B do not emit light at the same time.

In some embodiments, as shown in FIG. 13, the first light incident surface 634s1 and the second light incident surface 634s2 of the light guide plate 634 are similar to the first light incident surface 434s1 and the second light incident surface 434s2 of the light guide plate 434, which may be, for example, arc-shaped surfaces or other similar curved surfaces.

In some embodiments, as shown in FIG. 13, the light-emitting dotting area 634A2 is also distributed based on the shape of the first light transmissive portion TP1, and when viewed from the front, the first light transmissive portion TP1 is within the range of the light-emitting dotting area 634A2.

With the above structural configuration, as shown in FIG. 13, the first light incident surface 634s1, the second light incident surface 634s2, the third light incident surface 634s3, and the fourth light incident surface 634s4 can diffuse the light. Therefore, the distance between the first light-emitting element 632A and the first light transmissive portion TP1, the distance between the second light-emitting element 632B and the first light transmissive portion TP1, the distance between the second light-compensating element 632C and the first light transmissive portion TP1, or the distance between the first light-compensating element 632D and the first light transmissive portion TP1 can also be shortened (that is, the light mixing distance can be shortened), thereby achieving the effect of saving space. In addition, since both the first light-emitting element 632A and the first light-compensating element 632D and both the second light-emitting element 632B and the second light-compensating element 632C are respectively disposed along opposite sides of the light-emitting dotting area 634A2 (for example, disposed along the diagonal direction of the light guide plate 634) and facing each other to emit light, the first light-compensating element 632D and the second light-compensating element 632C can brighten one end of the first light transmissive portion TP1 away from the first light-emitting element 632A and the second light-emitting element 632B, thereby enabling the first light transmissive portion TP1 to emit light uniformly. In practical applications, when the first light transmissive portion TP1 switches between different colors of light, the first light transmissive portion TP1 can emit light uniformly with the support of the first light-compensating element 632D and the second light-compensating element 632C.

Figure 14:
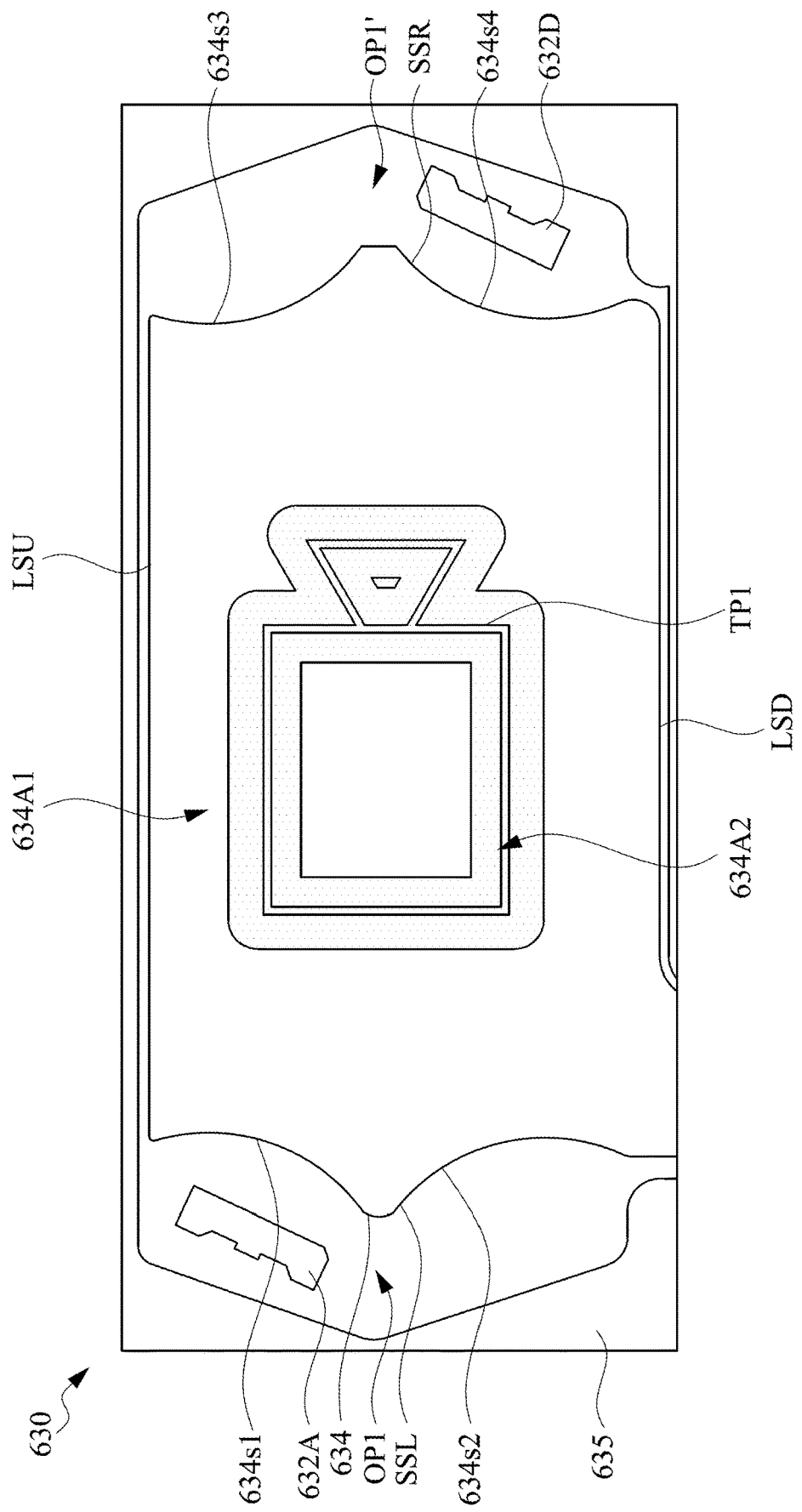
FIG. 14 is a front view of the light-shielding plate and the light guide plate in accordance with another embodiment of the present disclosure.

Reference is made to FIG. 14. FIG. 14 is a front view of a part of the backlight module 630 in accordance with another embodiment of the present disclosure. The structural configuration of the backlight module 630 in FIG. 14 is substantially similar to the structural configuration of the backlight module 630 in FIG. 13. The difference is that the backlight module 630 in FIG. 14 includes the first light-emitting element 632A and the first light-compensating element 632D merely and does not include the second light-emitting element 632B and the second light-compensating element 632C. In practical applications, as shown in FIG. 14, when the first light transmissive portion TP1 only needs to emit monochromatic light, the backlight module 630 can only be disposed with the first light-emitting element 632A and the first light-compensating element 632D, and the first light-emitting element 632A and the first light-compensating element 632D are disposed on a side of the first light incident surface 634s1 and a side of the fourth light incident surface 634s4 respectively. In the same way, the first light-emitting element 632A and the first light-compensating element 632D may also be disposed on a side of the second light incident surface 634s2 and a side of the third light incident surface 634s3 respectively.

Based on the above discussions, it can be seen that in the backlight module of the present disclosure, since the light-partitioning portion is disposed between the first light-emitting dotting area and the second light-emitting dotting area, the light-partitioning portion can shield the light that emitted by the light-emitting elements used to individually light up different light transmissive portions, so that the light is separated without interfering with each other, thereby allowing several light-emitting patterns displayed by different light transmissive portions can be presented independently. In the backlight module of the present disclosure, since the light guide plate is disposed with a light-emitting dotting area including several dots, and the light-emitting dotting area is disposed corresponding to the light transmissive portion, the light-emitting pattern displayed on the light transmissive portion can have sufficient brightness. In the backlight module of the present disclosure, since the first light-emitting axis of the first light-emitting element and the second light-emitting axis of the second light-emitting element are not parallel to the first long axis direction of the light guide plate, the light transmissive portions disposed close to the edge of the light guide plate can still achieve the visual effect of uniform light when lit by light-emitting elements of different colors. In the backlight module of the present disclosure, when the light emitted by the light-emitting element continues to propagate and the energy is attenuated, since the density of the dots gradually increases along the distributing direction away from the light-emitting element, the brightness at one end of the light transmissive portion away from the light-emitting element is not reduced due to the attenuation of light energy. In the backlight module of the present disclosure, since the light incident surface of the light guide plate has a light-diffusion structure with an arc-shaped surface or a rough surface, the light can be diffused before reaching the light-emitting dotting area, thereby achieving the effect of shortening the light mixing distance.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A backlight module, comprising:
   a circuit board;
   a light-shielding plate disposed over the circuit board and having a first light transmissive portion;
   a light guide plate having a first light-emitting dotting area disposed corresponding to the first light transmissive portion, wherein the first light-emitting dotting area includes a plurality of first dots, and the first dots are non-evenly distributed within a range of the first light-emitting dotting area;
   a light-partitioning portion disposed adjacent to the light guide plate, wherein the light guide plate, the light-partitioning portion, and the light-shielding plate surround a first accommodating area, and a light mixing zone is located between the first accommodating area and the first light-emitting dotting area;
   a first light-emitting element and a second light-emitting element disposed on the circuit board, wherein at least one of the first light-emitting element and the second light-emitting element passes through the first accommodating area and emits light toward the first light-emitting dotting area; and
   a reflective sheet disposed between the light guide plate and the circuit board,
   wherein the first light-emitting element forms a first illuminating zone along a first light-emitting axis with a first light-emitting angle, and the second light-emitting element forms a second illuminating zone along a second light-emitting axis with a second light-emitting angle,
   wherein the light guide plate has a light-emitting surface in a generally rectangular shape, the light guide plate has a first long axis direction extending along a long side of the light-emitting surface, the first light-emitting element has a second long axis direction perpendicular to the first light-emitting axis, the second light-emitting element has a third long axis direction perpendicular to the second light-emitting axis, and the second long axis direction and the first long axis direction form an acute angle, wherein the first light-emitting dotting area is located within a range where the first illuminating zone and the second illuminating zone overlap.

2. The backlight module of claim 1, wherein a density of the first dots gradually increases along a distributing direction away from the first light-emitting element or the second light-emitting element, and the distributing direction is parallel to the first light-emitting axis and forms an acute angle with the first long axis direction.

3. The backlight module of claim 1, wherein the second long axis direction is parallel to the third long axis direction.

4. The backlight module of claim 1, wherein the second long axis direction is not parallel to the third long axis direction.

5. The backlight module of claim 1, further comprising a third light-emitting element disposed on the circuit board and further having a second accommodating area, the light guide plate further having a second light-emitting dotting area separated from the first light-emitting dotting area, and the third light-emitting element passing through the second accommodating area and emitting light toward the second light-emitting dotting area, wherein the second light-emitting dotting area includes a plurality of second dots, and the second dots are non-evenly distributed within a range of the second light-emitting dotting area.

6. The backlight module of claim 5, wherein the third light-emitting element forms a third illuminating zone along a third light-emitting axis with a third light-emitting angle, and the second light-emitting dotting area is located within a range of the third illuminating zone.

7. The backlight module of claim 6, wherein the third light-emitting element has a fourth long axis direction perpendicular to the third light-emitting axis, wherein the fourth long axis direction is perpendicular to the first long axis direction.

8. The backlight module of claim 7, wherein a density of the second dots gradually increases along a distributing direction away from the third light-emitting element, and the distributing direction is parallel to the first long axis direction.

9. The backlight module of claim 6, wherein the third light-emitting element has a fourth long axis direction perpendicular to the third light-emitting axis, wherein the fourth long axis direction forms an acute angle with the first long axis direction.

10. The backlight module of claim 9, wherein a density of the second dots gradually increases along a distributing direction away from the third light-emitting element, and the distributing direction forms an acute angle with the first long axis direction.

11. The backlight module of claim 5, wherein the light-shielding plate further includes a second light transmissive portion disposed corresponding to the second light-emitting dotting area.

12. The backlight module of claim 5, wherein the light-partitioning portion is disposed between the first light-emitting dotting area and the second light-emitting dotting area.

13. The backlight module of claim 1, wherein the light guide plate has a first light incident surface and a second light incident surface facing the first light-emitting element and the second light-emitting element respectively, and the first light incident surface is recessed away from the first light-emitting element and the second light incident surface is recessed away from the second light-emitting element.

14. The backlight module of claim 1, wherein the light guide plate has a first light incident surface and a second light incident surface facing the first light-emitting element and the second light-emitting element respectively, and the first light incident surface and the second light incident surface are zigzag surfaces.

15. The backlight module of claim 1, wherein the light guide plate has a first light incident surface and a second light incident surface facing the first light-emitting element and the second light-emitting element respectively, the backlight module further includes a first light-compensating element and a second light-compensating element, and the light guide plate further has a third light incident surface and a fourth light incident surface facing the second light-compensating element and the first light-compensating element respectively, wherein the first light-compensating element and the first light-emitting element are disposed along opposite sides of the first light-emitting dotting area, and the second light-compensating element and the second light-emitting element are disposed along opposite sides of the first light-emitting dotting area.

16. A light guide module, comprising:
a light-shielding plate having a first light transmissive portion;
a light guide plate disposed below the light-shielding plate, the light guide plate having a first light-emitting dotting area, the first light-emitting dotting area being disposed corresponding to the first light transmissive portion, wherein the light guide plate has a first light incident surface and a second light incident surface disposed adjacent to a short side of the light guide plate, wherein the light guide plate is disposed with a first accommodating area and a second accommodating area that are hollowed; and
a light-partitioning portion disposed below the light-shielding plate,
wherein the first light-emitting dotting area includes a plurality of first dots, and a density of the first dots gradually increases along a direction away from the short side,
wherein the first light incident surface has a first normal line, the second light incident surface has a second normal line, and the first normal line and the second normal line pass through the first light-emitting dotting area,
wherein each of the first normal line and the second normal line respectively forms an acute angle with a long side of the light guide plate.

17. The light guide module of claim 16, wherein the first light incident surface and the second light incident surface are arc-shaped surfaces.

18. The light guide module of claim 16, wherein the first light incident surface and the second light incident surface are zigzag surfaces.

19. The light guide module of claim 16, wherein the first light incident surface and the second light incident surface are planar surfaces.

20. The light guide module of claim 16, wherein the first accommodating area is formed by being surrounded by the light-shielding plate, the first light incident surface, and the light-partitioning portion, and the second accommodating area is formed by being surrounded by the light-shielding plate, the second light incident surface, and the light-partitioning portion.

* * * * *